United States Patent [19]

Chiuminatta et al.

[11] Patent Number: 5,689,072

[45] Date of Patent: Nov. 18, 1997

[54] METHOD AND APPARATUS FOR PRELOADING A SKID PLATE FOR AN EARLY CUTTING CONCRETE SAW

[76] Inventors: Edward R. Chiuminatta, 16405 Everett, Riverside, Calif. 92508; Alan R. Chiuminatta, 231 Avenida Vista Del Oceano, San Clemente, Calif. 92672

[21] Appl. No.: 679,132

[22] Filed: Jul. 12, 1996

[51] Int. Cl.⁶ ................................................ B28D 1/04
[52] U.S. Cl. .................... 73/862.541; 29/404; 29/407.28
[58] Field of Search ........................... 73/865.9, 862.541, 73/432.1; 125/13.01, 36; 30/388, 390, 391, 506; 29/404, 407.01, 407.05, 407.08

[56] References Cited

U.S. PATENT DOCUMENTS

| | | |
|---|---|---|
| 4,036,042 | 7/1977 | Kubota et al. ................ 29/407.08 |
| 5,429,109 | 7/1995 | Chiuminatta et al. ............ 125/13.01 |

*Primary Examiner*—Robert Raevis
*Attorney, Agent, or Firm*—Knobbe, Martens, Olson & Bear, LLP

[57] ABSTRACT

A skid plate for a concrete saw has opposing ends connected by a truss, with mounting fixtures that connect opposing ends of a skid plate to the concrete saw. The mounting portions are connected to an apparatus that simulates the saw's mounting structure, and that simulates the load distribution the saw exerts on the skid plate in use. Sensors detect the force or deflection at various locations on the skid plate that occurs from the simulated load. One end of the truss and skid plate are moved relative to each other to adjust the sensor readings on the skid plate to achieve a predetermined profile that reduces raveling of a concrete surface during cutting.

42 Claims, 13 Drawing Sheets

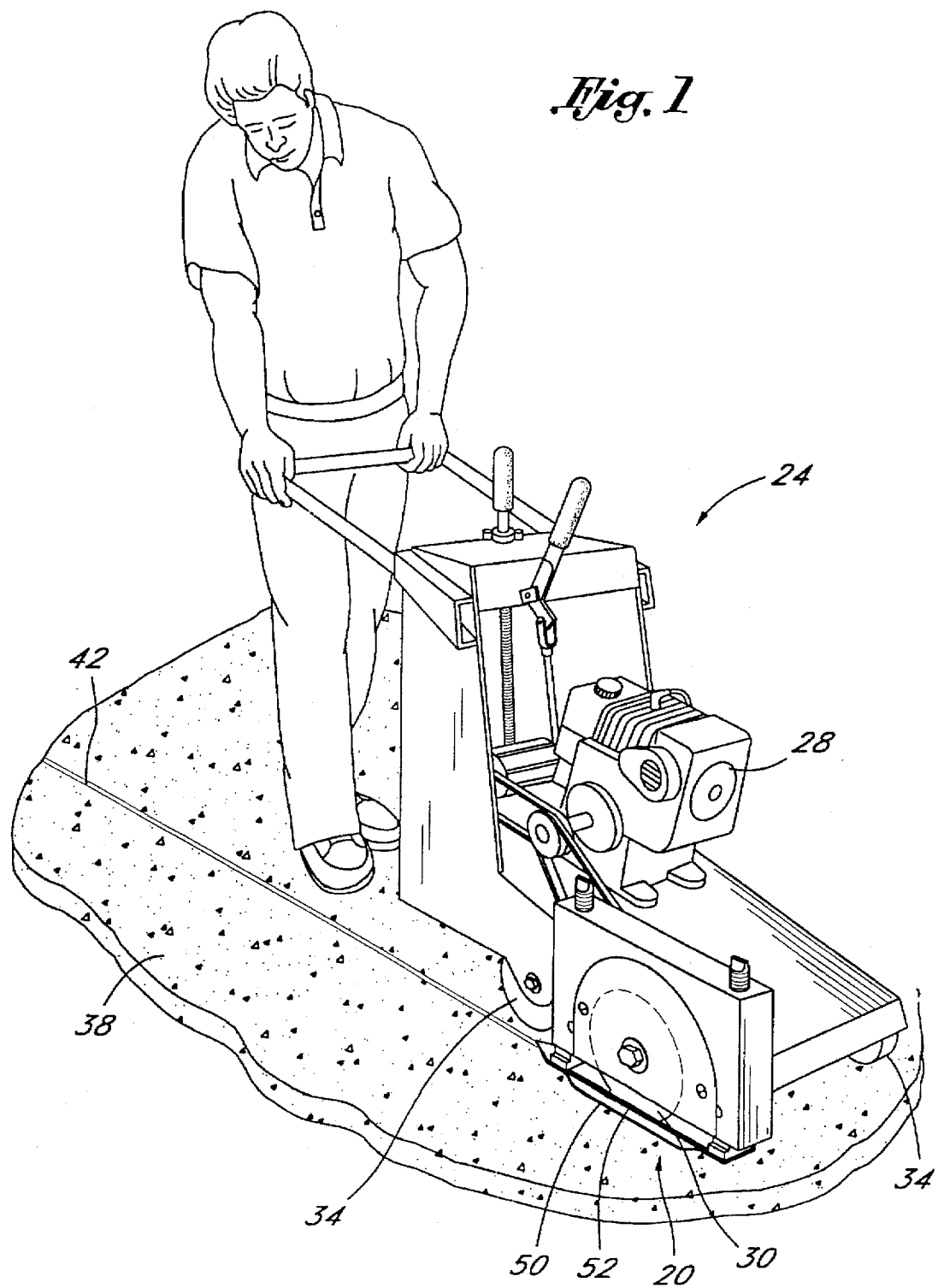

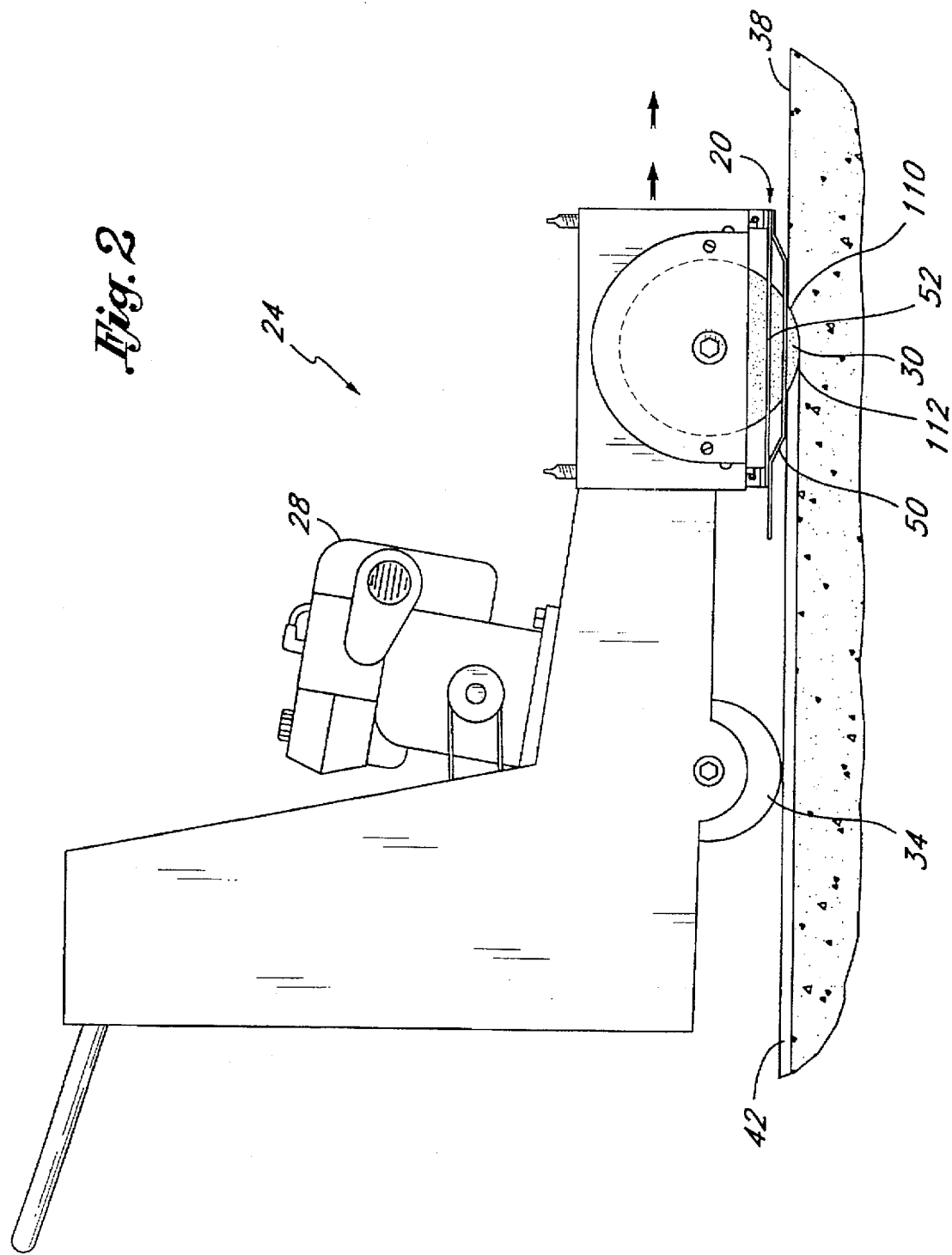

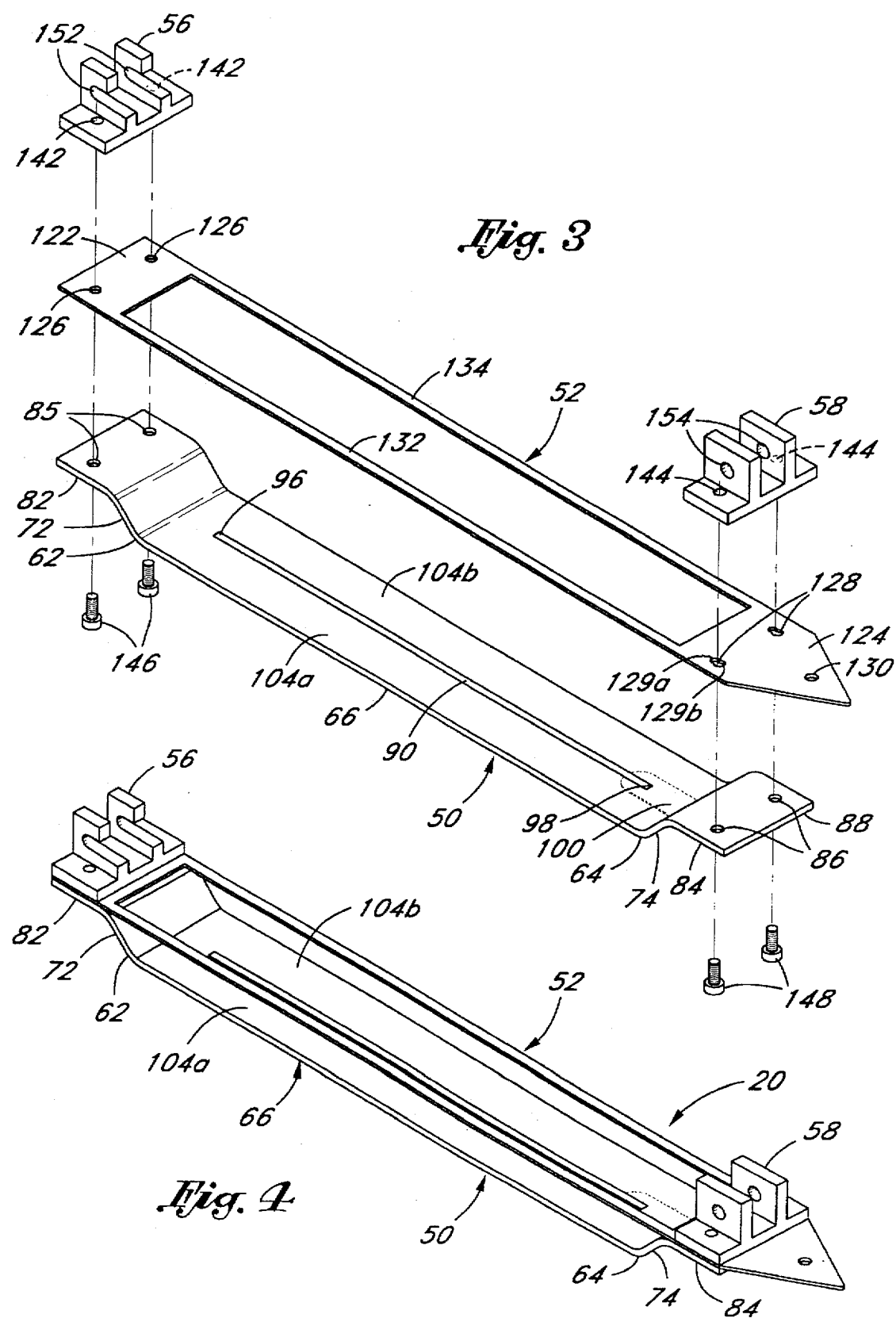

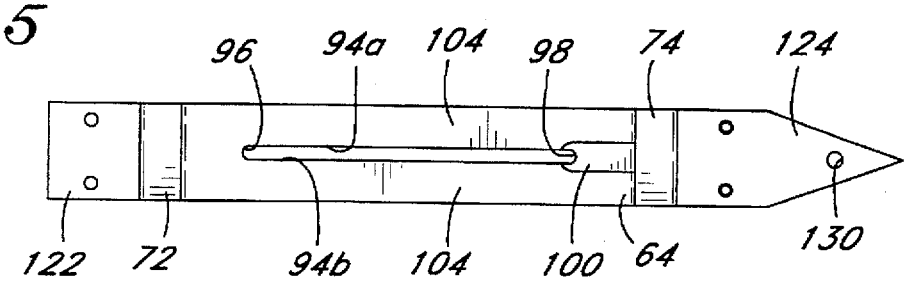
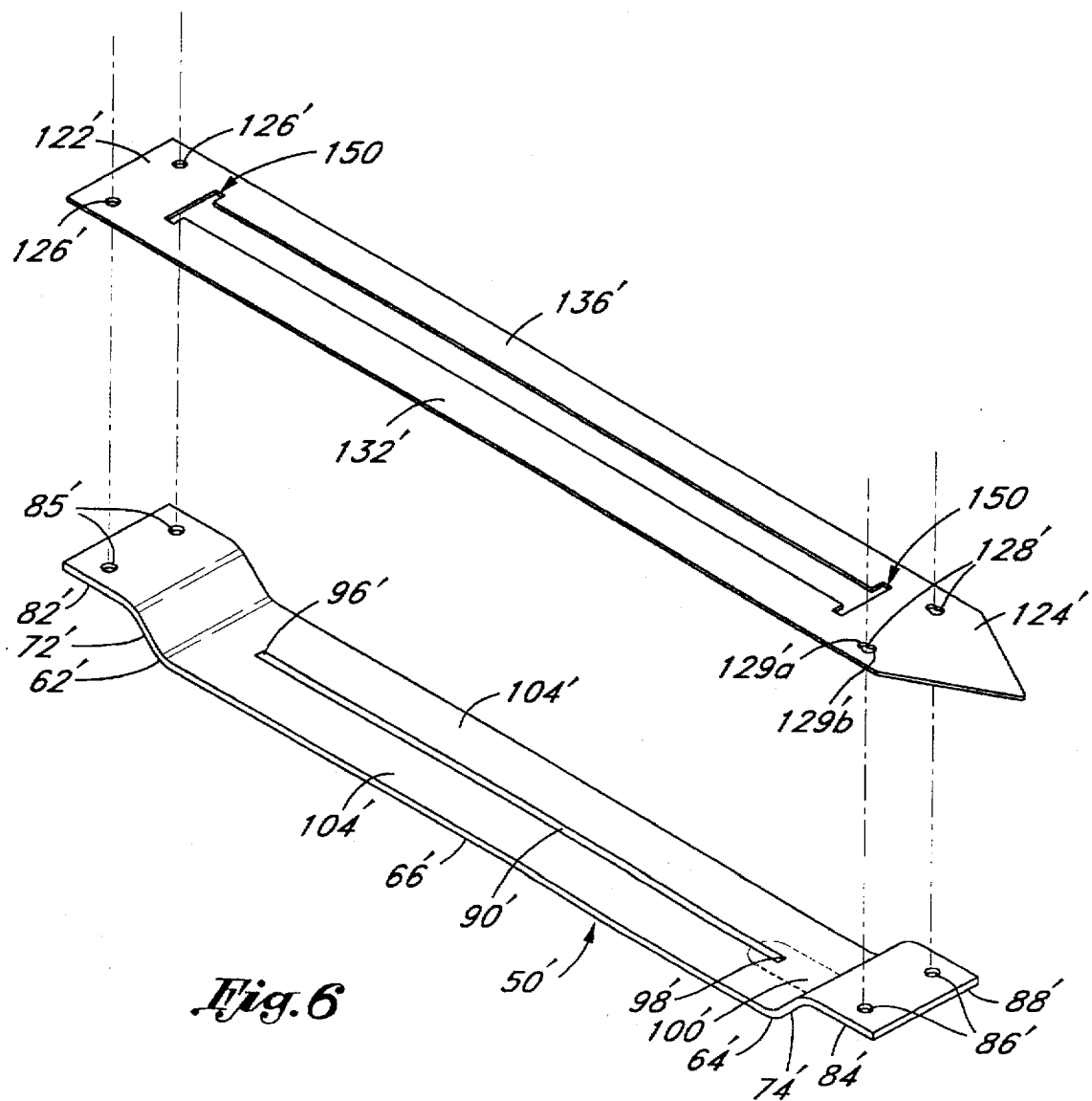

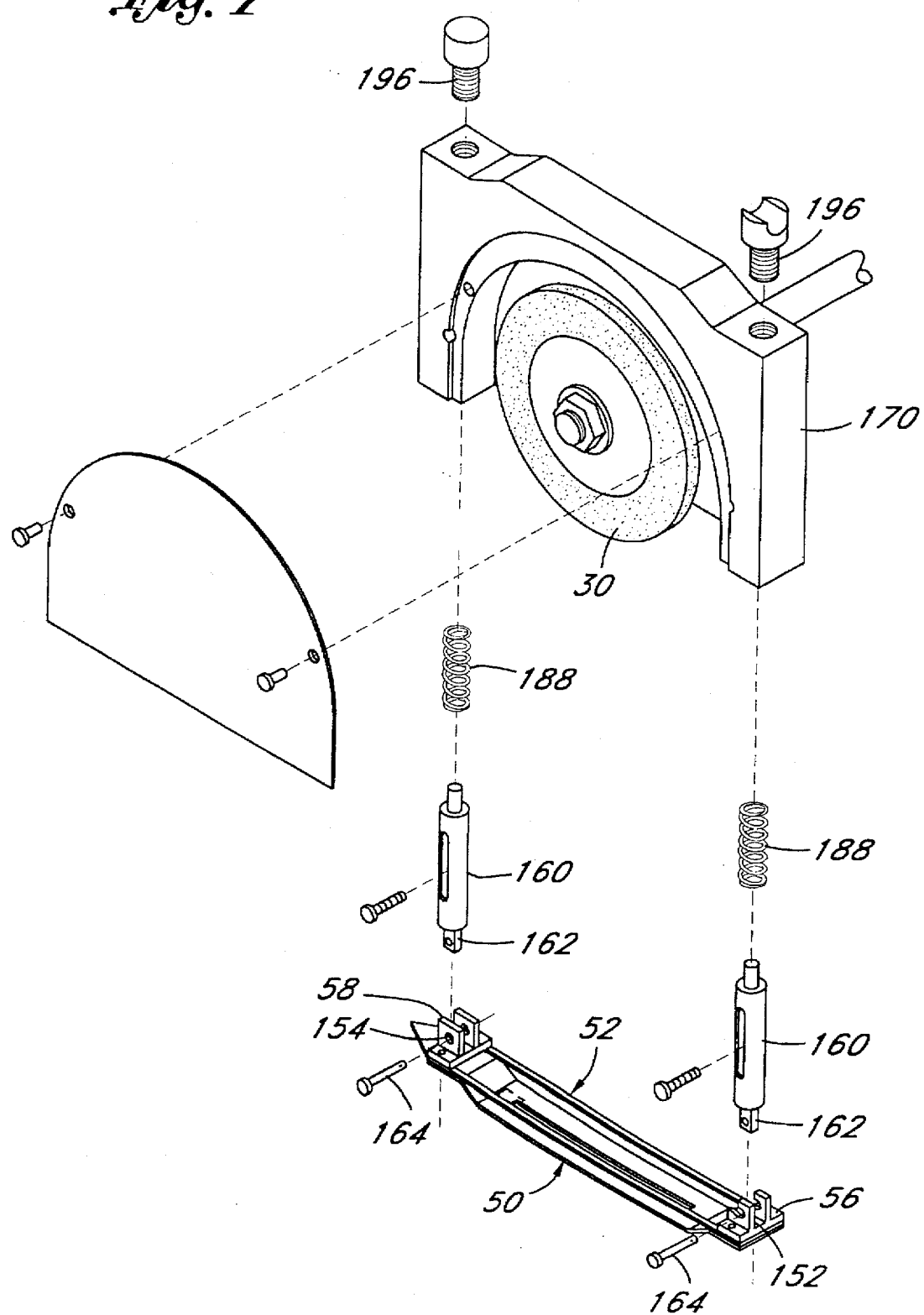

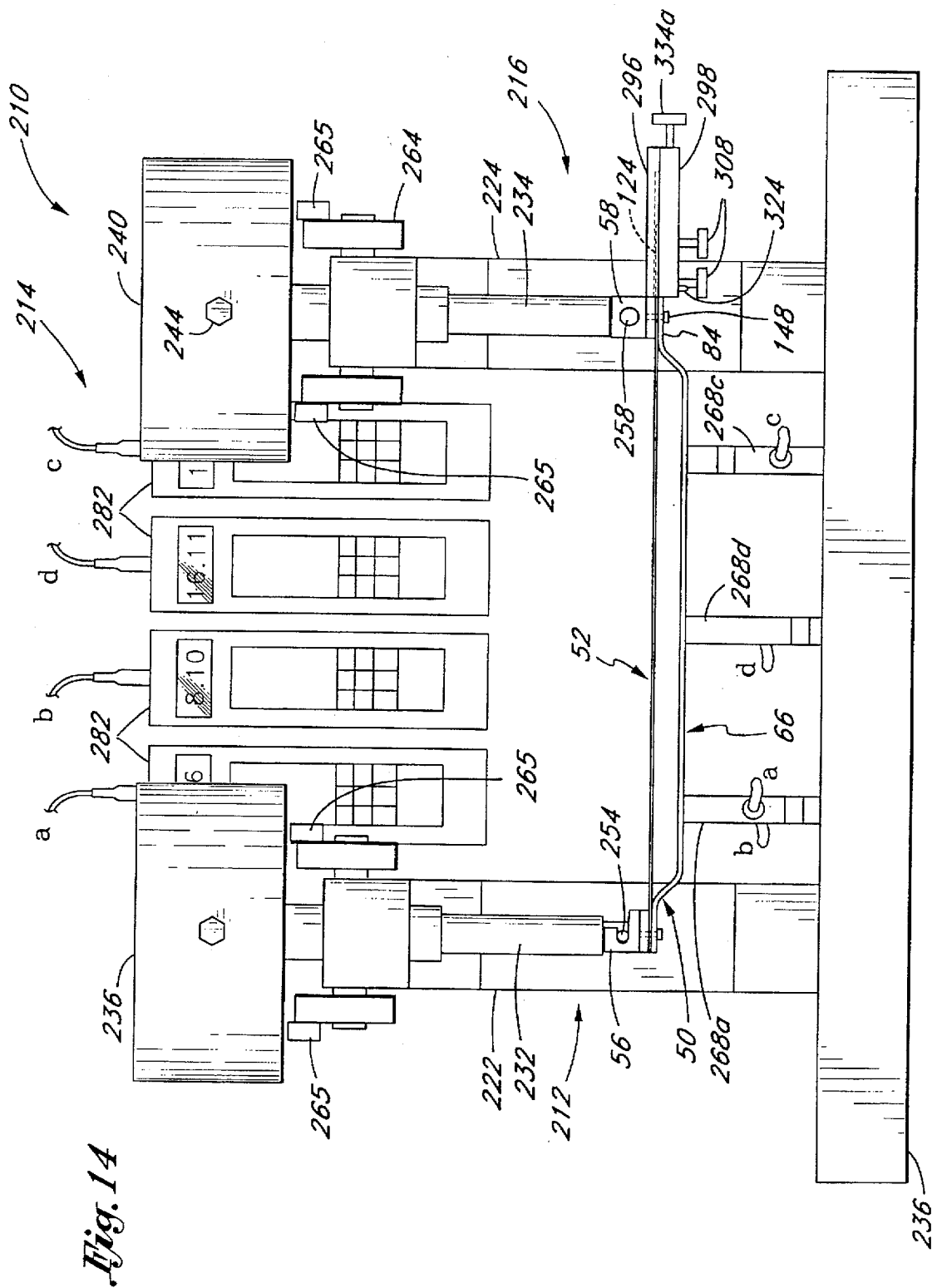

METHOD AND APPARATUS FOR PRELOADING A SKID PLATE FOR AN EARLY CUTTING CONCRETE SAW

FIELD OF THE INVENTION

This invention relates to a method and apparatus for preloading a skid plate assembly to ensure that the skid plate asserts a predefined force on a concrete surface during cutting in order to reduce raveling of the groove cut in the concrete.

BACKGROUND OF THE INVENTION

It is common practice to provide grooves at predetermined intervals in the surface of poured concrete to confine crack growth along the grooves and minimize cracking in the remainder of the concrete. Conventional concrete cutting saws cut these grooves after the concrete has hardened sufficiently to prevent undue damage to the concrete surface by the weight of the saw and operator as well as the saw blade action and water lubricant used for the saw blade.

More recent, early cutting saws use up-cut rotating blades to cut the grooves at hardnesses lower than practical with conventional saws. These early cutting saws support the concrete surface during cutting to reduce raveling. The support must be within a sufficiently close distance to the rotating cutting blade, and along a sufficient length of the cutting blade to reduce raveling. These distances and lengths can vary with the concrete hardness, but the support is most critical adjacent the up-cutting edge of the cutting blade where raveling, spalling and chipping more readily occur.

One type of early cutting saw uses a skid plate to support the concrete surface. But as the saws become bigger and heavier in order to use larger diameter cutting blades, difficulties arise if a skid plate is used to support the concrete along a substantial length of the cutting blade. The weight of the saw causes the skid plate to bend so that the skid plate does not maintain sufficient contact with or support of, the concrete surface. A lack of contact or insufficient support of the surface can lead to raveling of the cut groove, especially if the lack of contact occurs adjacent the leading edge.

The weight of the saw also causes the skid plate to bend and exert a non-uniform pressure on the concrete surface, resulting in non-uniform support of the concrete surface during cutting. As the skid plate traverses uneven concrete surfaces, this non-uniform support can cause portions of the skid plate to loose contact with the concrete surface or provide insufficient support—which can cause raveling.

There is thus a need for a skid plate that maintains contact with the concrete surface during cutting, and that exerts a sufficient force, or at least a predetermined force distribution, on the concrete surface along the length of the skid plate.

These problems were previously addressed by pre-bending the skid plate in an attempt to compensate for the deformation caused by the weight of the saw during operation. A truss held the skid plate in the pre-bent position. But unfortunately raveling of the cut groove still occurs, especially on concrete surfaces that are not sufficiently flat. Indeed, slight depressions or rises in the concrete surface of about 1/16 to 1/8 of an inch over the length of the skid plate (roughly one foot or 0.25 m) could cause raveling—depending on the hardness of the concrete and the closeness of the support to the cutting blade during cutting.

There is, therefore, a need for an improved support for the concrete surface that reduces raveling during cutting. There is a further need for a reliable method of consistently producing or adjusting a skid plate for use in reducing that raveling. Where this reduction in raveling is achieved by deforming a skid plate, there is a further need for a method and device for achieving a desired preloading with sufficient accuracy, and consistently doing so, and for determining what preloading produces the desirable results.

SUMMARY OF THE INVENTION

A skid plate is placed on a multi-point sensing system that can sense the amount of deformation occurring at a plurality of points on the skid plate when various loads are applied to the skid plate. The amount of deformation may be sensed directly or it may be sensed indirectly by measuring the resistive forces the skid plate exerts on one or more supports. Preferably the deformation is detected by sensors at a plurality of locations on the central portion of the skid plate that contacts the concrete during cutting, and that has a slot through which the cutting blade extends to cut the concrete during cutting. A truss holds the skid plate in its desired position once a predetermined deformation or force distribution is achieved. The deformation or load distribution deformed position is adjusted by moving the truss relative to the skid plate in response to the sensors. Preferably, the deformation is adjusted for a uniform force distribution from the leading end to the trailing end of the skid plate, and from side to side on the skid plate. Once the force or deformation is adjusted to the desired distribution, the truss is fastened into place to hold the predetermined deformation or force distribution until the skid plate is used.

There is thus disclosed a method of making a skid plate assembly to ensure that, when the skid plate assembly is mounted onto a concrete saw for cutting grooves on a concrete surface with a saw blade, the skid plate assembly provides adequate support for the concrete surface to minimize or prevent raveling. The skid plate assembly in particular maintains adequate pressure on and supports the concrete surface adjacent the location where the cutting blade exits the concrete surface, since raveling is especially prone to occur in that region. Raveling can also occur in an area adjacent the location where the cutting blade enters the concrete. The skid plate assembly desirably provides sufficient support for the concrete surface in that area as well. The skid plate assembly desirably provides support, more desirably uniform support, for the concrete surface along the entire length from where the cutting blade enters the concrete to where the curing blade exits the concrete. The skid plate assembly advantageously also provides uniform support for the concrete surfaces on both sides of the cutting blade.

There is thus advantageously provided a method of calibrating a skid plate assembly, where the assembly comprises a skid plate having at a leading and trailing end with least a first mounting portion configured to be releasably fastened to a saw. The mounting portion is connected to a support portion which has a slot through which a cutting blade extends during cutting. The slot has a leading end through which an up-cutting edge of the blade passes during cutting. A truss connects to opposing portions of the skid plate to maintain it in a predetermined configuration. The calibration process applies a predetermined loading to the skid plate, with the loading causing the support portion to deform. The deformation of the skid plate is monitored or sensed at least at one location. The deformation of the support portion of the skid plate is adjusted to achieve a predetermined deformation of the support portion. The truss is then connected to the skid plate to hold that predetermined deformation.

Advantageously the loading applied to the skid plate is selected to simulate an operational load exerted on the skid plate by the saw. This loading may also be advantageously selected to simulate the load on the skid plate during cutting of grooves in a concrete surface before the concrete has hardened sufficiently to crack. Further, the loading may advantageously be selected to apply substantially equal loads to opposing ends of the skid plate, wherein each of the applied loads is less than about 50 pounds (23 kg).

The deformation of the support portion is advantageously adjusted to achieve a deformation causing a substantially uniform force distribution along the length of the support portion during cutting, and also to achieve a substantially uniform force distribution on opposite sides of the leading end of the slot in the skid plate. This force distribution may be achieved by moving the truss relative to the skid plate.

Advantageously the skid plate has a truss comprising a first truss member located above a first side of the support portion of the skid plate, and a second truss member located above a second side of the skid plate. The first and second sides of the skid plate are located on opposing sides of the slot in the support portion of the skid plate. For these skid plate and truss assemblies, adjusting the force in the first truss member affects the deformation of the second side of the support portion, and vice versa. Once the desired force distribution or deformation is obtained for this type of skid plate assembly, opposing ends of the truss are connected to opposing mounting portions located at opposite ends of the skid plate, to hold the desired deformation.

There is thus provided a truss with a first end and a second end, the first end being fastened to the first mounting portion of the skid plate, the second end being adjustably coupled to a second mounting portion of the skid plate. Because the mounting portions are not in the plane of the support portion of the skid plate, the moving one of the mounting portions relative to the truss deforms the skid plate and adjusts the deformation. The resulting skid plate assembly provides superior support to the concrete surface during cutting and provides a superior finish adjacent the grooves cut in the concrete.

The apparatus used to calibrate this skid plate advantageously has at least one support located and configured to contact the support portion of the skid plate assembly during calibration. A load application apparatus is configured to apply a predetermined load at a predetermined location on the skid plate assembly, with at least a portion of that load being transferred to the support. There is thus provided load application means for applying a predetermined load to the skid plate assembly to simulate predetermined operating conditions, with at least a portion of that force being transferred to the support.

At least one sensor cooperates with the support to detect the force exerted on the support during calibration, with the sensor providing output information correlated to the magnitude of the force. There is thus provided sensor means cooperating with the support or with the skid plate to detect the deformation of the support during calibration, the sensor providing output information for use in adjusting the force distribution or deformation profile.

Advantageously, the support comprises at least at two locations adjacent to and on opposite sides of the leading end of the slot when the skid plate assembly is placed on the apparatus for calibration. More advantageously, the support is located at least at the leading and trailing ends of the support portion of the skid plate, and at a location between the leading and trailing ends of the support portion of the skid plate. There is thus provided a support means for supporting the skid plate assembly during calibration.

The adjustment device is configured to deform the skid plate assembly to vary the sensor output, thus achieving the desired force distribution or deformation. There is thus advantageously provided adjustment means for varying the skid plate deformation. The adjustment device contacts adjacent ends of the skid plate and truss to move them relative to one another. Because the truss is offset from the support portion of the skid plate, the skid plate deforms and allows adjustment of the force distribution or deformation profile of the skid plate. Preferably, the adjustment device grips one end of the truss and pushes the corresponding end of the skid plate to cause relative movement between the truss and skid plate. The adjustment device could be modified to grip the skid plate and push the truss, or it could be modified to apply forces to opposing ends of the skid plate or truss.

There is thus provided method and apparatus for calibrating the forces in a skid plate assembly, to achieve predictable and repeatable performance of the skid plate during cutting.

BRIEF DESCRIPTION OF THE DRAWINGS

FIG. 1 is a perspective view of the concrete saw in operation.

FIG. 2 is an up side view of the saw in operation.

FIG. 3 is an exploded side perspective view of the skid plate assembly.

FIG. 4 is a side perspective view of the assembled skid plate assembly of FIG. 3.

FIG. 5 is a bottom plan view of the skid plate.

FIG. 6 is a side perspective view of a different embodiment of a skid plate and a truss.

FIG. 7 is an exploded perspective view of the skid plate assembly support.

FIG. 14 is a front elevational view of the apparatus assembly of FIG. 10.

DETAILED DESCRIPTION OF THE PREFERRED EMBODIMENT

Figure 8:
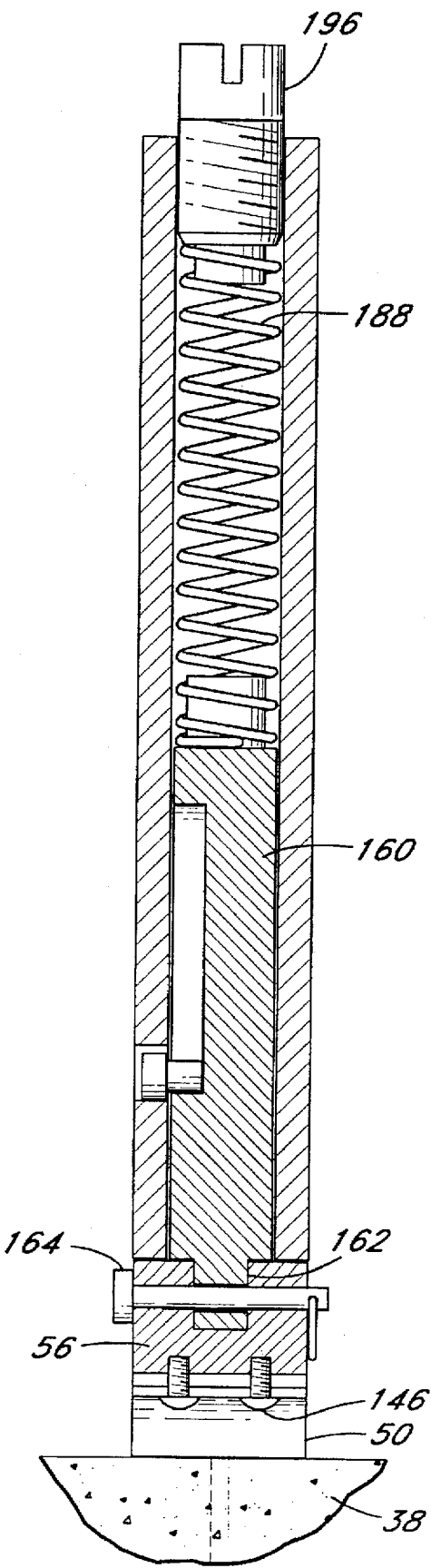
FIG. 8 is a cut away view of the blade housing, cutting blade, and skid plate with supports.

As the method and apparatus involves a skid plate assembly, for a saw, one illustrative embodiment will be briefly described first. FIGS. 1 and 2 show a skid plate assembly 20 removably connected to a concrete cutting saw 24. The saw 24 includes a motor 28 mounted thereon for rotating a concrete curing blade 30, preferably in an upcut direction. The concrete cutting blade 30 may have a diameter of 8–14 inches (20–35 cm), although larger and smaller blades can be used to cut the concrete. The saw 24 has a plurality of wheels 34 for supporting the saw 24 on the concrete surface 38 during cutting of grooves 42 in the concrete surface. A saw of this general type is described in more detail in U.S. Pat. No. 5,305,729, the content of which is incorporated herein by reference, and portions of which are described in further detail later in this specification.

Referring also to FIGS. 3 and 4, the skid plate assembly 20 includes a skid plate 50 connected to a truss 52 and mounting portions 56, 58 by fasteners 146, 148. The truss 52 may be fastened by other means known in the art, such as rivets, adhesives, welding, interference fits or frictional engagements. The leading mounting block 56 and a trailing mounting block 58 are attached to the skid plate 50 and truss 52 for mounting onto the saw 24. As used herein, "leading" corresponds to the direction that the saw 24 moves during cutting, while "trailing" in the opposite direction. Basically, the skid plate 50 is deformed to offset the deformation that occurs when the skid plate 50 is used. The truss 52 holds the deformation in place until the saw 24 is in use.

The skid plate 50 has leading and trailing skid plate mounting portions 82, 84, respectively, parallel to but offset from the central portion 66 of the skid plate 50. Curved portions 62, 74 connect the mounting portions 82, 84 to opposing ends of the central portion 66. Central portion 66 contains slot 90 through which the cutting blade 30 extends during cutting to cut the concrete. A leading end 96 is located in the direction that the saw travels during cutting, and is located adjacent the up-cutting edge of the cutting blade as it exits from the concrete surface during cutting. A trailing end 98, and a recessed portion or tunnel 100 are located at the trailing end of the slot 90.

The skid plate assembly 20 is movably mounted relative to the saw 24, as shown in FIGS. 1, 7 and 8. Shafts 160 are slidably constrained to move in cylindrical bores (FIG. 8) in the saw 24, with each opposing end of the skid plate 50 being mounted to one of these shafts 160 through the pins 164 and mounting holes and slots 154, 152, respectively. It is this mounting that exerts a force on the skid plate assembly 20 during operation, which causes the skid plate 50 to deform. The force exerted on the skid plate 50 can be varied by turning screws 196 to vary the compression of springs 188 resiliently urging the shafts 160 and skid plate 50 against the concrete, as apparent to one skilled in the art from the teachings of this application and FIGS. 7–8.

Applicants have discovered that one way to reduce raveling is to calibrate the skid plate assembly 20 of FIGS. 3–5 under simulated operational conditions to ensure that a sufficient pressure is applied by the saw 24 through the skid plate 50 to the concrete surface 38 during operation. Applicants have found that it is advantageous to calibrate the skid plate assembly 20 to ensure the skid plate 50 is pressed against the concrete surface 38 with adequate pressure in an area adjacent the location where the upcut cutting blade 30 exits the concrete. It is desirable to further ensure sufficient pressure in an area adjacent the location where the cutting blade 30 enters the concrete. It is more desirable to calibrate the skid plate assembly 20 to distribute the pressure on the concrete surface 38 generally uniformly along the length of the middle portion 66 of the skid plate 50 which contacts the concrete surface 38 during operation. It is also advantageous to distribute the pressure on the concrete surface 38 generally evenly across the width of the middle portion 66 of the skid plate 50.

One method of calibrating the skid plate assembly 20 illustrated in FIGS. 3–6 is to precisely adjust the preloading or initial deformation of the skid plate 50 by the truss 52. The preloading can be calibrated by adjusting the position of the elongated holes 128 on the trailing mounting portion 124 of the truss 52 through which the fasteners 148 are attached with respect to the circular holes 86 on the skid plate 50. The adjustment is performed with the leading mounting portion 122 of the truss 52 generally fixed with respect to the leading mounting portion 82 of the skid plate 50. The elongated holes 128 preferably have a sufficient length and are disposed at a location to allow adjustment of both tensile and compressive preloading on the skid plate 50 by the truss 52.

By fastening the skid plate assembly 20 such that the fasteners 148 are located adjacent the leading ends 129a of the elongated holes 128, i.e., the holes 86 are aligned with the leading ends 129a of the elongated holes 128, the arms 132 and 134 of the truss 52 are stretched in tension longitudinally. Through the fasteners 146 and 148, the truss 52 exerts a compressive longitudinal preloading on the skid plate 50. On the other hand, if the fasteners 148 are located adjacent the trailing ends 129b of the elongated holes 128, i.e., the holes 86 are aligned with the trailing ends 129b of the elongated holes 128, the arms 132 and 134 of the truss 52 experience longitudinal compression. As a result, the truss 52 exerts a longitudinal tensile force on the skid plate 50. It is understood, however, that other means of adjusting the preloading on the skid plate 50 may be employed without departing from the spirit and scope of this embodiment.

The following device and method are used to set the amount of deformation to offset or counteract the deformation that occurs during cutting of the concrete.

Calibration Apparatus

Referring to FIGS. 3–4, previously, the leading end 122 of truss 52 was fastened to skid plate 52 and leading mounting block 56 by fasteners 146. At the trailing end, fasteners 148 loosely held trailing mounting block 58 to the trailing portion of truss 52 and skid plate 50. A spring scale was connected to hole 130 in the truss 52 to apply a known preload to the truss. Then the fasteners 148 were tightened. But this preloading was never consistent. It did not control the force or deformation because it had no way to determine the deformation or force along the length or width of the skid plate. Thus, the deformation and resulting support of the concrete varied along the length of the skid plate, and from side to side on the skid plate. The resulting distribution of the loads and deformation was not uniform and was not repeatable. It resulted in raveling (spalling, chipping, cracking, etc.) during normal use, and when the skid plates traversed either depressions or mounds in the concrete.

Figure 9:
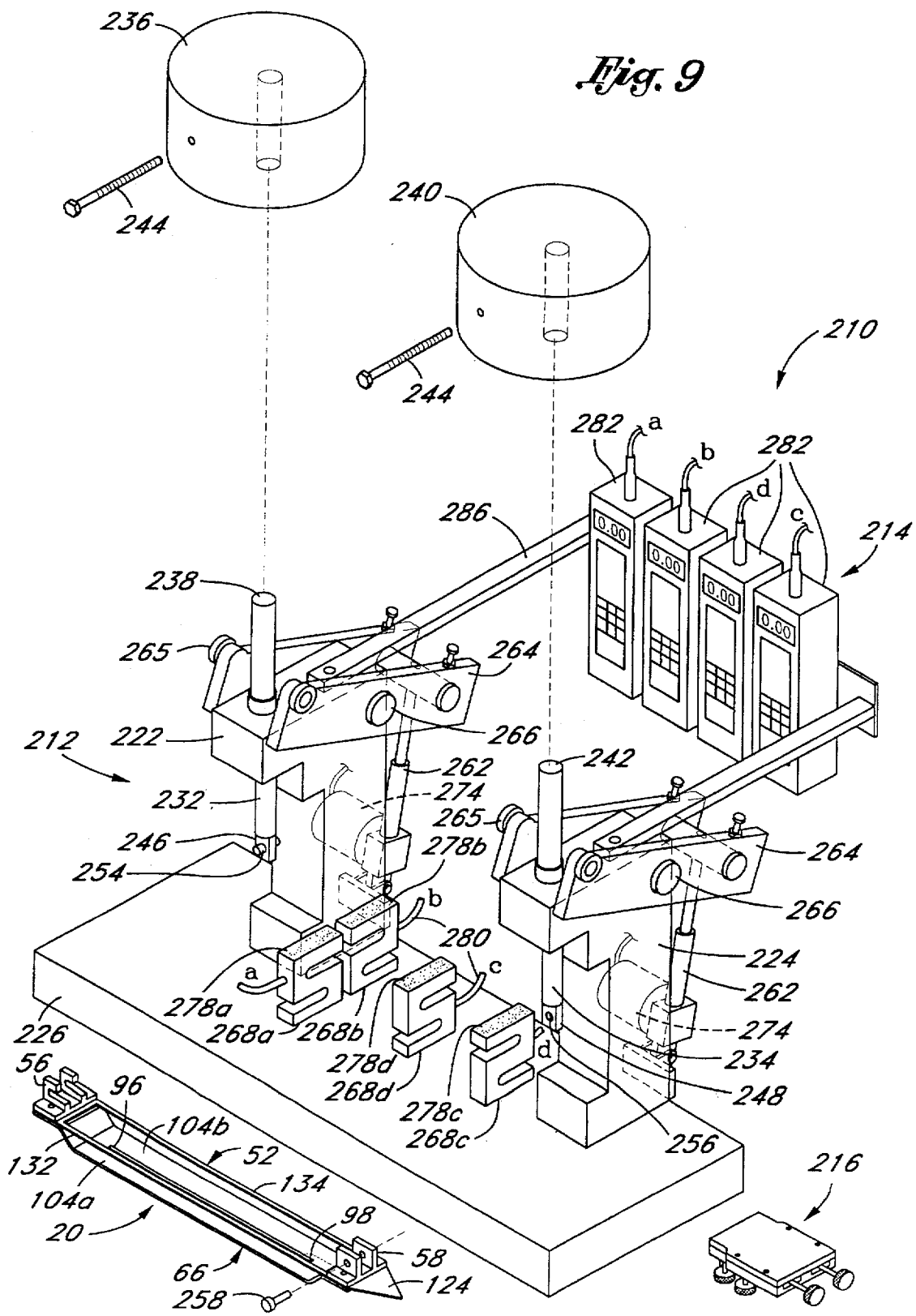
FIG. 9 is a partially exploded perspective view of a calibration apparatus for calibrating the skid plate assembly.
Figure 10:
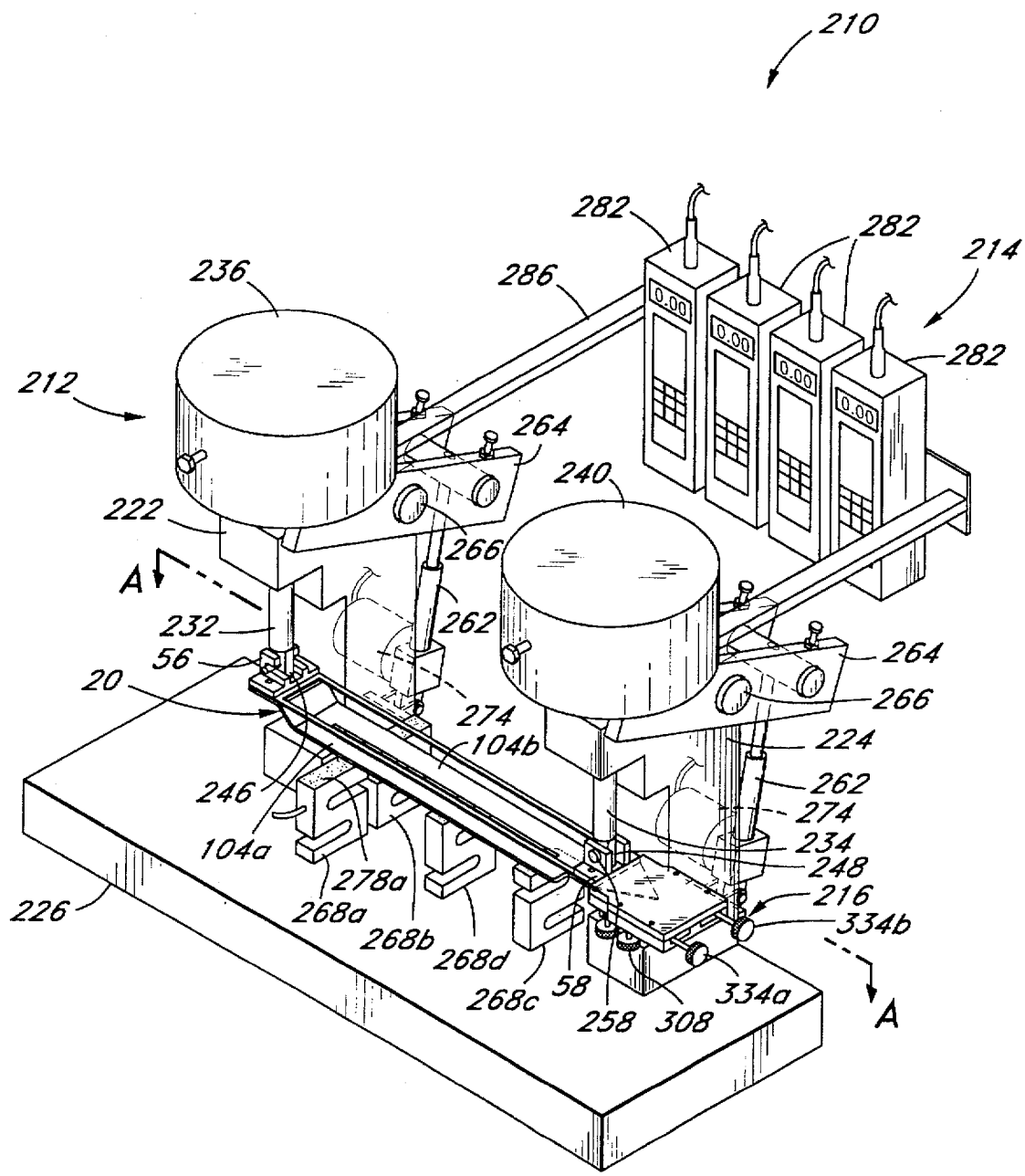
FIG. 10 is a perspective view of an apparatus assembly of the skid plate assembly mounted on the calibration apparatus of FIG. 9.

To precisely, repeatedly and predictably adjust the preload or initial deformation on the skid plate assembly 20 a calibration apparatus 210 is used as illustrated in FIGS. 9–16. As best seen in FIG. 9, the apparatus 210 comprises a loading module 212 which simulates actual loading exerted on the skid plate 50 by the saw 24 (FIG. 2) when in operation; a detection module 214 for sensing the force profile throughout the middle or support portion 66 of the skid plate 50, and an adjustment unit 216 for adjusting the preloading or deformation of the skid plate 50 and the truss 52. The assembled apparatus 210 is illustrated in FIG. 10.

The loading module 212 advantageously has a structure configured to simulate the actual magnitude and application of the loads applied to the skid plate assembly 20 by the saw 24 during cutting. As shown in FIGS. 9 and 10, the loading module 212 desirably includes a left frame 222 and a right frame 224 extending along a first axis, perpendicular to the skid plate 50. A support base 226 is preferably parallel to support portion 66 of skid plate 50, and supports frames 222, 224.

Advantageously, the frames 222 and 224 are substantially identical in structure and configured with a leading shaft 232 extending through a bore (not shown) at the distal end of left frame 222, and a trailing shaft 234 extending through a bore (not shown) at the distal end of right frame 224. The shafts 232, 234 can slide along a direction parallel to the first axis. A leading weight 236, preferably of lead, is placed on a top end 238 of the leading shaft 232. A trailing weight 240 is placed on a top end 242 of the trailing shaft 234. Screws 244 extend through the weights 236, 240 and frictionally engage the ends 238, 242 to secure the weights 236 and 240 to the shafts 232, 234.

The shafts 232, 234 have bottom ends 246, 248 configured to mount the skid plate assembly 20 (FIGS. 3-4). The bottom end 246 of the leading shaft 232 is constructed to attach the leading mounting block 56, and the bottom end 248 of the trailing shaft 234 to attach the trailing mounting block 58. As configured, the leading mounting portion 82 of the skid plate 50 is advantageously disposed directly under the leading weight 236 through the leading shaft 232 and the trailing mounting portion 84 directly under the trailing weight 240 through the trailing shaft 234. To simulate actual operational conditions, the shafts 232, 234 of the loading module 212 are preferably substantially the same as the shafts 160 of the saw 24.

The skid plate assembly 20 is placed into the calibration apparatus 210 as shown in FIGS. 9 and 10. The skid plate assembly 20 is positioned so that the shafts 232, 234 extend into the mounting blocks 56, 58 (FIG. 3-4) on the skid plate assembly. The bottom end 246 of the leading shaft 232 has a pin 254 through its diameter producing an end on each opposing side of shaft 232. Advantageously, the pin 254 is fixed to the shaft 232. The pin 254 preferably corresponds in diameter to the pins 154 used in the saw (FIG. 7). The ends of the pin 254 slide into the mounting slot 152 of the mounting block 56. The bottom end 248 of the trailing shaft 234 has a hole 256 through which a pin 258 (FIGS. 10 and 11) can pass to attach the mounting block 58. One skilled in the art with knowledge of this disclosure would recognize that different connections between the skid plate and calibration assembly could be used, especially if the skid plate assembly 20 used a different mounting structure to connect to the saw 24.

Referring to FIGS. 9, 10, and 14-16, a linkage is used to move the shafts 232, 234. The linkage is moved by a pair of actuators, such as solenoids or other electric, hydraulic or pneumatic actuators. Preferably hydraulic actuators are used to move a pair of members 262 having a first end rotatably mounted to the support base 225. The second end of each member 262 is connected to a first end of pivotally mounted lever arms 264. The lever arms 264 are rotatably mounted at pivot 266 to frames 222, 224. The second end of lever arms 264 each have a circular ball bearing 265 that is located so that it can be urged against one of the weights 236, 240 to lift the weight. The hydraulic members 262 are advantageously actuated with a hand-held control (not shown) easily accessible by a technician operating the calibration apparatus 210.

Below the skid plate 50 are a plurality of support blocks 268a–268d. The support blocks 268a–268d are preferably in a plane substantially parallel to the skid plate 50, to simulate a flat surface that does not cause the skid plate 50 to twist when the skid plate is urged against the blocks 268. Movement of the shafts 232, 234 determines whether the skid plate 50 contacts the blocks 268.

Figure 16:
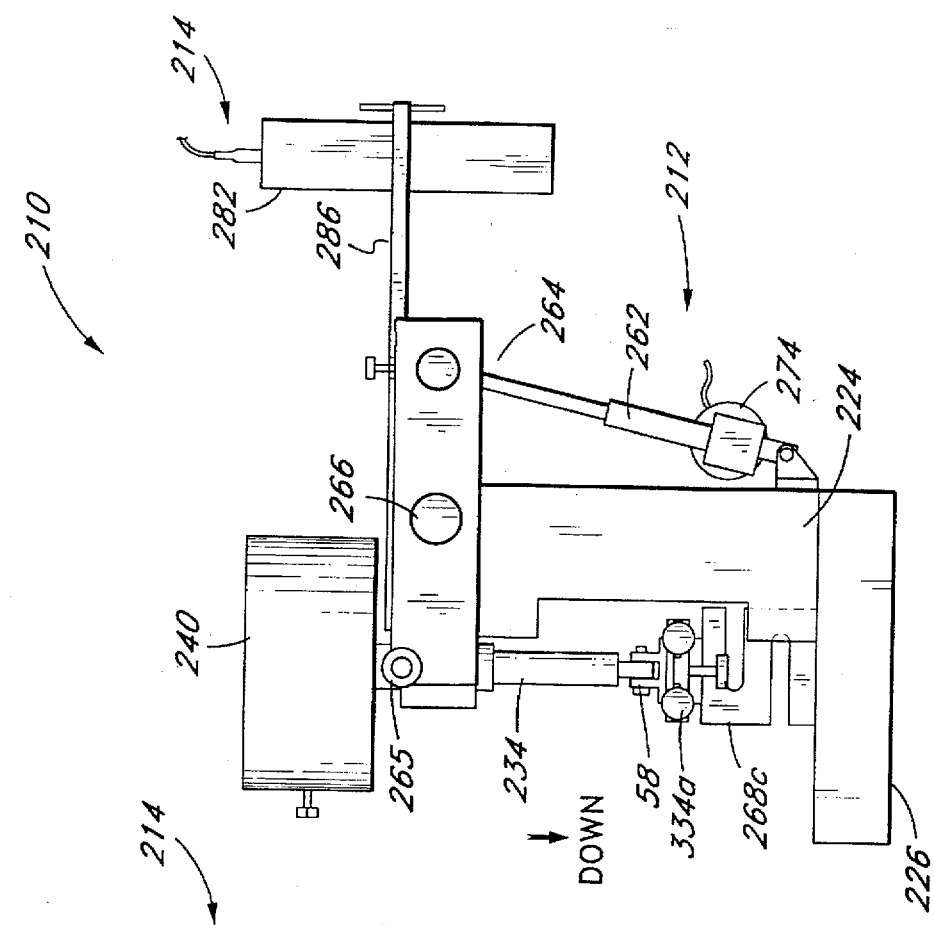
FIG. 16 is a side elevational view of the apparatus assembly of FIG. 10 in an engaged position.
Figure 15:
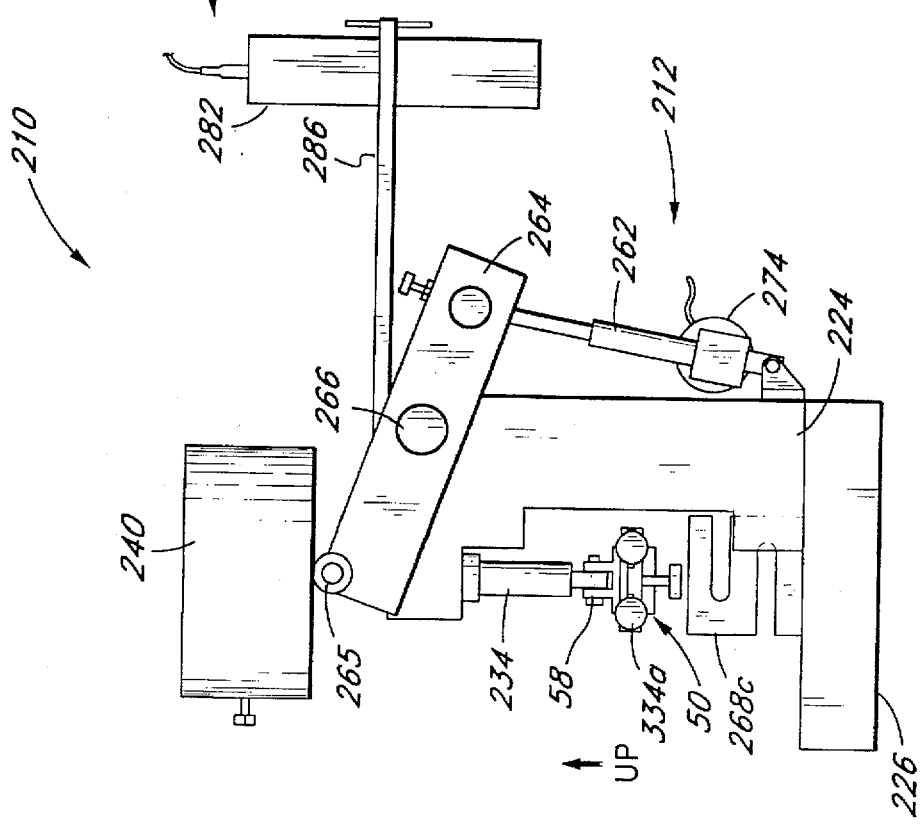
FIG. 15 is a side elevational view of the apparatus assembly of FIG. 10 in a disengaged position.

FIGS. 10 and 15 show the shafts 232, 234 at a disengaged position lifted away from the support blocks 268. In this disengaged position the hydraulic members 262 are fully retracted, causing the linkage to pivot and urge the ball bearings 265 against the weights 236, 240 to lift the weights, shafts 232, 234, and attached skid plate assembly 20. Thus, the skid plate 50 does not contact the blocks 268 and is held only by the shafts 232, 234. Referring to FIGS. 14 and 16, an engaged or loaded position is shown when the hydraulic members 262 are extended, the lever arms 264 rotate toward the support blocks 268, moving the bearings 265 out of contact with the weights 236, 240 so that the weights urge shafts 232, 234 and attached skid plate assembly 20, toward the support blocks 268. When the skid plate 50 fully engages or contacts support blocks 268, the operational loading that the saw 24 exerts on the skid plate assembly 20, is simulated.

The weights 236, 240 are selected to simulate the load the saw 20 exerts on the leading mounting block 56 and trailing mounting block 58 of the skid plate assembly 20. The shafts 232, 234 are mounted to move freely in the frames 222, 224 once released by the lifting mechanism. The connection between the shafts 232, 234 and the skid plate assembly 20 simulates the connection used on the saw 20. Thus, the apparatus 210 is designed to cause the central portion 66 of skid plate 50 that normally contacts the concrete to bend as it would bend during cutting of the concrete.

Referring to FIGS. 9 and 10, the detection module 214 includes sensors 278a–278d disposed on the surfaces of or inside the support blocks 268a–268d for sensing the pressure applied on the blocks 268a–268d by the skid plate assembly 20 through the middle portion 66 of the skid plate 50 when the loading apparatus 212 is in the engaged or DOWN position for loading. A variety of sensors can be used, such as strain gages, load cells or other types of force sensors. Because the force is related to the amount of skid plate deformation, motion or displacement sensors can also be used, such as photo cells, laser interferometers, or other types of motion and displacement sensors. Similarly, because the force can be correlated to a deformation that would occur if the support blocks 268 were not there, the sensors 278 may also be considered to be measuring deformation, and a reference to detecting the deformation will be used to also include detecting the force, and vice versa. Suitable modification to the apparatus would be made to suit the particular type of sensor used. Preferably though, load cells are used, specifically Chatillon digital force gages with a 200 pound capacity.

The sensors 278 are ideally distributed along the entire length of the middle portion 66 of the skid plate 50 along its longitudinal axis to obtain a force distribution, force profile or deformation profile on the middle portion 66, but it is generally not feasible to do so. As a result, selective sensing of the forces or deformation at discrete locations on the skid plate 50 is used.

Figure 11:
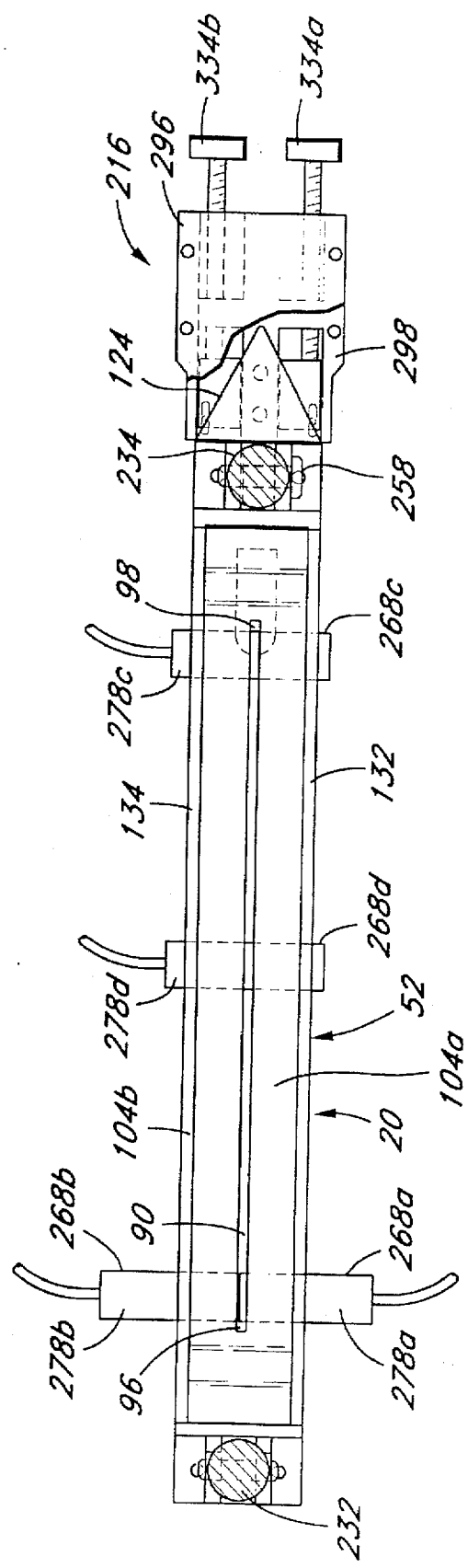
FIG. 11 is a partial top plan view of the apparatus assembly of FIG. 10 taken along line A—A.

Because the pressure at the region where the cutting blade 30 exits the concrete surface 38 is believed to be most critical, at least one support block is advantageously located to support the skid plate 50 adjacent the leading end 96 of the slot 90, as best seen in FIGS. 10, 11 and 14. There are advantageously first and second support blocks 268a and 268b adjacent the leading end 96 of the slot 90, one on each side of the slot 90 in order to measure the force or to indicate the deformation on each side of the slot 90. The use of a support block and sensor on each side of the slot 90 allows balancing of the loads across the width or lateral dimension of the skid plate 50 to adjust for twisting of the skid plate.

Referring to FIG. 11, the support blocks 268a, 268b are preferably positioned slightly away from the end 96 of the slot 90 so that the center of the blocks 268a, 268b correspond to the location at which the cutting blade 30 exits the concrete during cutting. During cutting, the blade 30 can move relative to the concrete as it hits aggregate entrained in the concrete. Thus, a reading over the variable location of the cutting edge is desirable. It is believed suitable, but less preferable, to position the blocks 268a, 268b elsewhere, even in front of the leading end 96 of the slot 90. Of course, the force or deformation sensors 278a–278d are preferably positioned with the support blocks 268a–268d, and sense the deformation or force at those same locations.

An approximately even load distribution along the length of the middle portion 66 of the skid plate 50 is believed preferable. As shown in FIGS. 9–11, a third support block 268c is placed at a location to support the middle portion 66 of the skid plate 50 adjacent the trailing end 98 of the slot 90, close to where the blade 30 enters the concrete surface 38 during cutting as depicted in FIG. 7. A fourth support block 268d is placed approximately midway between the leading end 96 and trailing end 98 of the slot 90. The third and fourth support blocks 268c, 268d, extend across the slot 90 to support the skid plate 50 on opposing sides of the slot 90. Using two separate support blocks and sensors at each of these locations, with sensors on opposing sides of the slot 90, is also believed suitable, but using a single sensor at each location is simpler and has proven adequate.

The sensors 278a–278d are desirably electronic digital force gage sensors that provides accurate force readings over the surfaces of the support blocks 268a–268d. The sensors 278a–278d in the preferred embodiment are 200-lb load cells. Sensors 278a–278d with different capacities would be selected as amount of weight on the skid plate 30 varies. Each sensor (278a–278d) is connected through a cable 280 to corresponding electronic digital meter 282 to visually display the force readings. The digital meters 282 are desirably placed on the calibration apparatus 210 so that a person can see the force readings during calibration. As shown in FIG. 10, the electronic meters 282 may be mounted on a mounting frame 286 extending horizontally from the left and right frames 222, 224 of the loading module 212. Other mating configurations are also suitable.

As the support surfaces on supports 268a–268d are in the same plane, there is thus provided a means for measuring the force that the skid plate 50 exerts on a flat surface. Preferably, the force exerted is measured at the leading and trailing ends of the portion of the skid plate contacting the concrete, and also in the middle of the skid plate. That measured force can be correlated to a deformation that would occur if the support were not there, and thus the sensor may also be considered to be measuring deformation. One skilled in the art who uses the teachings of the present disclosure could devise suitable apparatus, sensors and sensor location to measure the desired forces or deformations of other skid plate assemblies having different configurations.

Force Or Deformation Adjustment Unit

Figure 12:
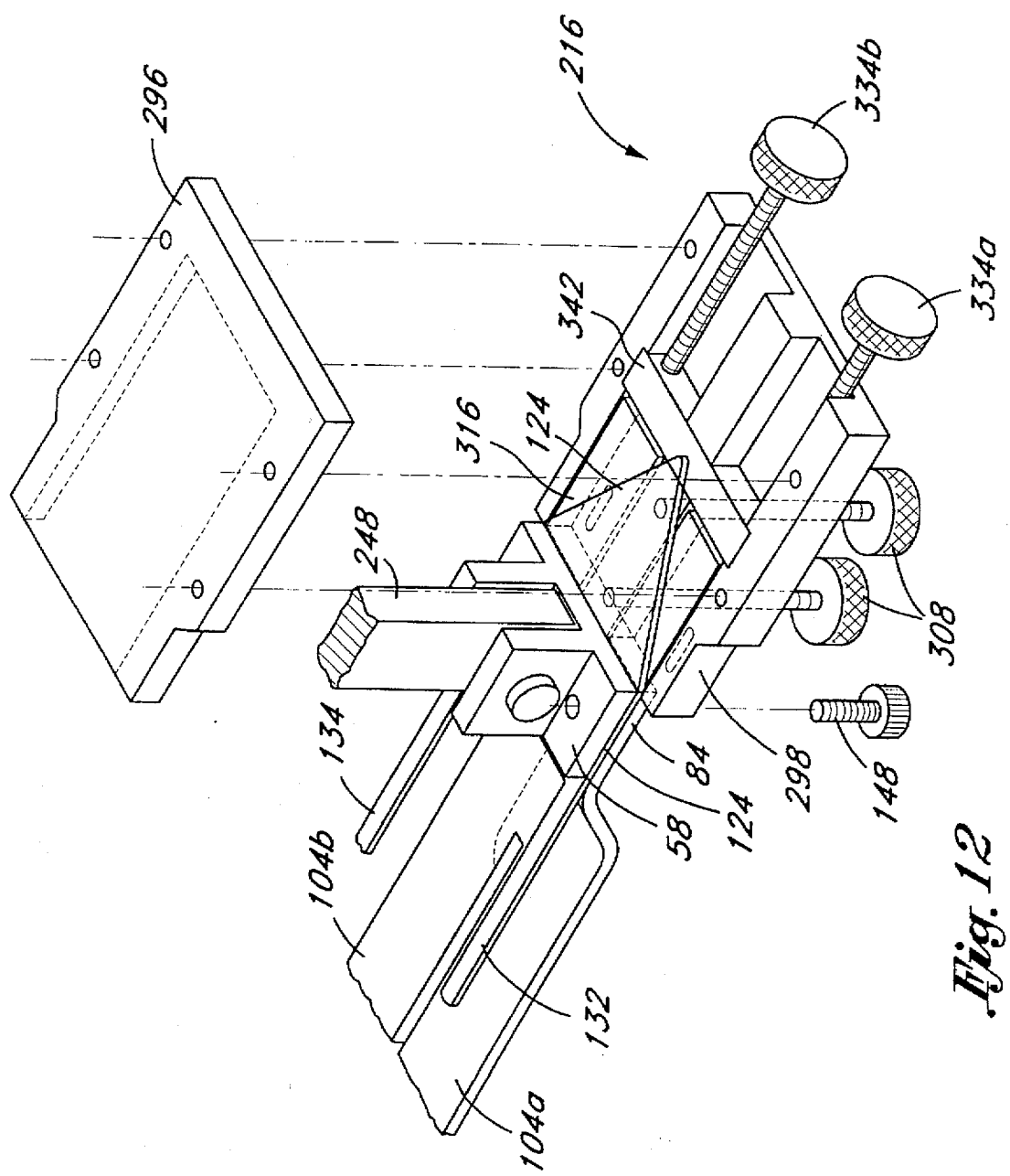
FIG. 12 is a partial perspective view of the apparatus assembly of FIG. 10 illustrating the mounting of the adjustment unit.

FIGS. 11 and 12 illustrate the adjustment unit 216 mounted onto the trailing mounting portion 124 of the skid plate assembly 20. The adjusting unit 216 is used to adjust the preloading of the skid plate 50 held by the truss 52 by adjusting the deformation of the support portion 66 or by adjusting the resulting forces the support portion 66 exerts on a known surface or known sensor array. The skid plate is adjusted so that the support portion provides a predetermined support to the concrete surface during cutting, advantageously reducing and preferably eliminating raveling.

Simply described, one end of the truss 52 is fastened to the skid plate 50. Then the other end of the truss 52 and skid plate 50 are moved relative to one another causing the skid plate 50 to bend. The sensors 278 on the support blocks 268 detect this deformation or the resulting forces exerted on the sensors 278. Preferably, an array of sensors 278 is used. When the desired force profile or deformation is obtained, the truss 52 is fastened to the skid plate 50 to lock that force profile or deformation profile into place. This produces a skid plate assembly 20 with a precisely predetermined deformation that can be selected to offset the deformation occurring when the skid plate 50 is used during cutting of the concrete.

Because the skid plate assembly 20 is a pre-fabricated, pre-existing assembly, the adjustment unit 216 was configured to fit that pre-existing assembly. One skilled in the art, applying the teachings of this specification, can readily devise other ways of adjusting the forces or deformation for different configurations of skid plate assemblies. For the depicted skid plate assembly, the adjustment unit 216 shown in FIGS. 11–13 is an example of a suitable adjustment device.

As shown in FIGS. 3 and 12, the skid plate assembly 20 uses a truss 52 with a triangular trailing portion 124. Referring to FIGS. 11–14, the adjustment unit 216 engages or otherwise grips the trailing mounting portion 124 of the truss 52. A pair of adjustment devices that take the form of threaded knobs 334 are supported by the adjustment unit 216 and configured to adjust the position of the trailing mounting portion 84 of the skid plate 50 relative to the trailing mounting portion 124 of the truss 52. The end portion 124 of truss 52 is placed into a cavity 306 formed between a metal top plate 296 and a metal bottom plate 298 that are held together, preferably by fasteners such as rivets or screws 302. The cavity 306 is advantageously slightly larger than the size and thickness of the trailing mounting portion 124. The metal is preferably aluminum.

Two screws 308 extend through threaded holes 310 in the bottom plate 298 and extend into the cavity 306 toward the top plate 296. The trailing mounting portion 124 is placed into this cavity 306 and the screws 308 tightened to press the trailing mounting portion 124 against the top plate 296. The friction created by the screws 308 pressing the trailing mounting portion 124 against the top plate 296 is sufficient to grip that mounting portion prevent the trailing mounting portion 124 from slipping from the top plate 296 during calibration. Hand tightening the screws 308 by knobs on the ends of the screws 308 is sufficient to achieve this gripping. The screws 308 thus clamp the mounting portion 124 to the adjustment unit 216. Preferably the screws 308 pass through threaded holes 310 located along the mid-axis of the bottom plate 298. A longitudinal block or ridge 312 is provided in the bottom plate 298 to provide enough threaded area to enable the clamping.

Figure 13:
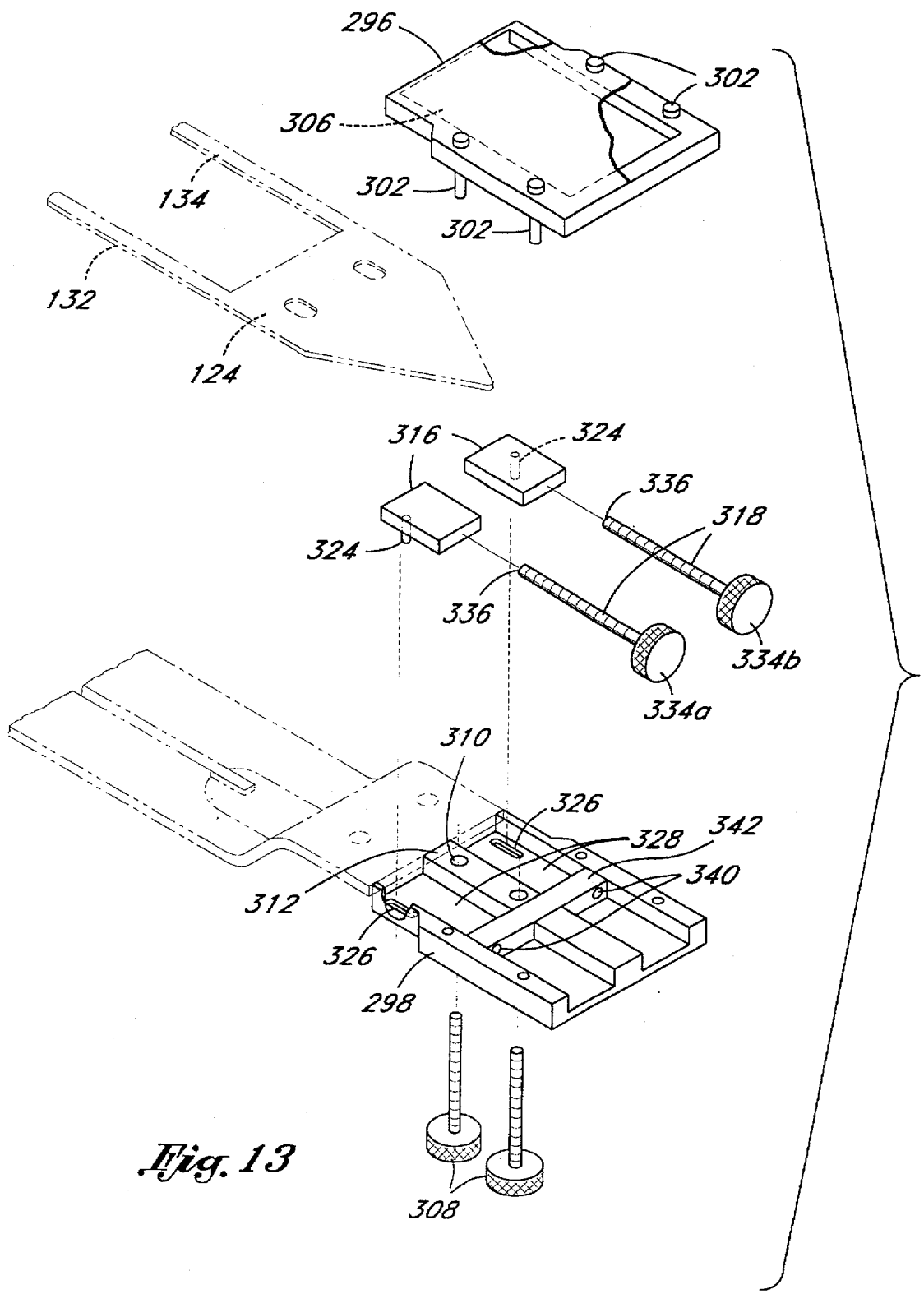
FIG. 13 is an exploded perspective of the adjustment unit.

Still referring to FIGS. 11–14, but primarily to FIG. 13, the aluminum bottom plate 298 of the calibration apparatus 216 has two slots 328 running the length of the plate 298 in a plane substantially parallel to the plane of the portion 66 of skid plate 50. A third slot is formed in the bottom of the plate 298, and extends perpendicular to these slots 328 and through the middle ridge 312. A stainless steel bar 342 is placed into this third slot. Two threaded holes 340 extend through the bar 342 in a plane substantially parallel to the plane of the portion 66 of the skid plate 50. Threaded adjustment screws 318 extend through these holes 40. Two generally rectangular, steel plates 316 are sized to slidably fit in the slots 328 on the opposite side of the bar 342 as the adjustment screws 334 and knobs 334. The ends 336 of adjustment screws 318 abut the ends of plates 316 and by turning the knob 334 the adjustment screws 318 can move the plates 316 along the slots 328. The tops of the sliding plates 316, the steel bar 342 and the middle ridge 312 are all in substantially the same plane so they do not obstruct insertion of the trailing mounting portion 124 into the cavity 306 of the adjustment unit 216.

The plates 316 have pins 324 at the side of the plate that is closest to the periphery of adjustment unit 216. Each pin 324 extends into a longitudinal slot 326 located in the bottom of the plate 298. The pins 324 limit the movement of the plates 316 along the slots 328, and keep the plates 316 from exiting the adjustment unit 216.

As best seen in FIGS. 10–14, when the adjustment unit 216 grips the trailing mounting portion 124, one end of the top plate 296 abuts the trailing mounting block 58. This abutment aligns the adjustment unit 216 as the mounting block 58 is at a predetermined orientation relative to the skid plate assembly. Preferably, the mounting block 58 abuts the adjustment unit 216 so the mounting block 58 and adjustment unit 216 are orientated along a line substantially parallel to the longitudinal axis of skid plate 50. The bottom plate 298 of adjustment unit 216 abuts the end of the trailing mounting portion 84 of skid plate 50. Further, the sliding plates 316 can be moved by screws 318 to push against the trailing mounting portion 84 of skid plate 50, thus creating relative movement between the truss 52 and skid plate 50. In essence, the truss 52 is being placed in tension while the skid plate 50 is being placed in compression, causing the skid plate 50 to bend. This bending is achieved by moving one of truss 52 of skid plate 50 relative to the other. In the depicted embodiment, the truss 52 is held while the skid plate 50 is moved, but one skilled in the art can devise other suitable structures and methods to achieve the desired force distribution or deformation given the present disclosures.

Referring to FIGS. 10–14, the skid plate assembly 20 is mounted onto the loading apparatus 212 at the mounting blocks 56, 58 by the bottom ends 246, 248 of the shafts 232, 234. The adjustment or calibration unit 216 can be connected to the skid plate assembly 20 either before or after the assembly 20 is placed on the loading apparatus 212, but is preferably done after the skid plate assembly 20 is mounted to the loading apparatus 212.

FIG. 15 shows the loading apparatus 212 at the disengaged or UP position wherein no loading is applied to the skid plate assembly 20 by the weights 236, 240 of the loading apparatus 212. In this disengaged position, the skid plate assembly 20 is not supported by the support blocks 268a–268d. This position simulates the position when the cutting blade 30 (FIG. 3) is not engaged with the concrete to cut grooves. FIG. 16 shows the loading apparatus 212 at the engaged, or DOWN position at which point the skid plate assembly 20 rests on the supports blocks 268a–268d and the load from the weights 236, 240 is applied at the two mounting blocks 56, 58 of the skid plate assembly 20. This engaged position simulates the loads on the skid plate assembly 20 that occur when cutting concrete on a flat surface.

Calibration Procedure

To calibrate the skid plate assembly 20 for a desired cutting performance, the skid plate assembly 20 is mounted onto the calibration apparatus 210, as shown in FIGS. 10 and 14–16. The loading module 212 is set at the disengaged position for mounting the skid plate assembly 20 (FIG. 15). Suitable weights 236, 240 are selected and positioned on top of the loading shafts 232, 234. The weights are selected to achieve the desired loading of the skid plate assembly 20. Preferably the weights are selected to simulate the forces applied to the skid plate 20 during operation of the saw 24. The leading mounting block 56 of the skid plate assembly 20 is rotatably and slidably connected to the bottom end 246 of the leading shaft 232 by sliding the ends of pin 254 into the mounting slot 152. The trailing mounting block 58 is attached to the bottom end 248 of the trailing shaft 234 by the pin 258.

The adjustment unit 216 is mounted onto the truss 52 by slipping the trailing mounting portion 124 into the gap or cavity 306 between the top plate 296 and the bottom plate 298. The sliding blocks 316 are disposed to bear against the trailing edge 88 of the skid plate 50. The screws 308 are tightened to urge the trailing mounting portion 124 against the top plate 296, gripping and fixing the mounting portion 124 with respect to the adjustment unit 216. The fasteners 148 (FIG. 3) that attach the trailing mounting portion 124 to the trailing mounting portion 84 of the skid plate 50 are slightly loosened during this period so that the truss 52 can move relative to the skid plate 50. The fasteners 148 travel along the elongated holes 128 in the truss 152 to allow this movement.

The hydraulic members 262 are activated by the motors 274 to move the loading module 212 from the disengaged, UP position to the engaged, DOWN position, such that the skid plate assembly 20 rests on the support blocks 268a–268d (FIG. 16) to simulate the desired loading on the skid plate assembly 20. The loading by the weights 236, 240 is now applied to the skid plate assembly 20 due to the constraint and reaction force provided by the support blocks 268a–268d against the middle portion 66 of the skid plate 50. The detection module 214 is activated so the sensors 278a–278d each provide a signal in response to the skid plate's middle portion 66 being urged against the support blocks 268a–268d. These sensor signals can be correlated to force or deformation, depending on the sensor type and display type. The signals are preferably visually displayed on electronic meters 282 (FIG. 14). The readings provide the forces or deformation at predetermined points along the length of the middle portion 66 and over the width of the middle portion 66 at a location adjacent the leading end 96 of the slot 90. Preferably, the forces the support portion 66 exerts on the supports 268 are displayed.

From the force readings shown on the digital meters 282, the adjustment unit 216 can be used to adjust the preloading on the skid plate 50 to calibrate the skid plate assembly 20 for a desired force or deformation profile. Preferably a generally uniform force distribution along the length and across the width of the middle portion 66 of the skid plate 50 is believed desirable to eliminate raveling. In the saw 24 illustrated in FIGS. 1, 2, 7, and 8, the weight or force applied to both ends of the skid plate assembly 20 through the shafts 160, is substantially equal. Thus, the weights 236 and 240 are preferably the same in the calibration apparatus 210 shown in FIGS. 9–16. In this situation where the weights are the same, the substantial symmetry of loading on the skid plate 50 by the loading module 212 results in the force or deformation readings being substantially symmetrical when the skid plate 50 is properly adjusted. The sensors 278c, 278d reflect the force or deformation on both sides of the slot 90 in the skid plate 50. But each of the sensors 278a, 278b at the leading end of the skid plate 50 indicate the force or deformation on only one side of the slot 90, thus the readings of sensors 278a, 278b are combined for the total force on, or deformation of, the skid plate at that location. Therefore, preferably the combined readings of the sensors 278a and 278b will be approximately equal to the reading from the sensor 278c, and approximately equal to the reading of the sensor 278d, when the sensors are located at the ends and middle of the support portion 66 of skid plate 50.

If the sensor 278d at the middle indicates a larger value or reading than that of the sensor 278c, and of the combined reading of sensors 278a, 278b, then the middle portion 66 of skid plate 52 is bowing slightly toward the middle sensor—which would correspond to bowing toward the concrete surface 38. The skid plate would thus be exerting more support of the concrete surface at the middle than at the ends of the skid plate. If the reading of the sensor 278d at the middle is smaller than the reading of the sensor 278c (and of the combined reading of sensors 278a, 278b), then the support portion 66 of the skid plate 50 is bowing away from the sensor 278—which would correspond to bowing away from the concrete surface 38. In this situation the skid plate would be exerting more support on the concrete surface at the ends of the skid plate than in the middle. Other combinations of readings indicate other bowing configurations and corresponding variations in the support provided by the skid plate to the concrete surface 38.

To change the preloading on the skid plate 50 the adjustment screws 318 of the adjustment unit 216 are used to move the truss 52 relative to the skid plate 50, causing the skid plate central portion 66 to bend in varying degrees and directions. Specifically, the sliding plates 316 are pushed toward the trailing edge 88 of the skid plate 50. The adjustment screws 318 are turned while the readings on the digital meters 282 are monitored until the desired preloading is achieved. For the illustrated configuration, tightening the screws 318 increases the tension in the truss 52 and bows the central portion 66 of the skid plate 50 for the depicted skid plate assembly 20. Loosening the screws 318 decreases the tension in the truss 52 for the depicted skid plate assembly 20.

When the desired force profile or deformation profile are achieved, the fasteners 148 are then tightened to lock-in this force distribution and skid plate deformation by firmly attaching the trailing mounting portion 124 of the truss 52 to the trailing mounting portion 84 of the skid plate 50. The skid plate 50 is thus preloaded to a desired condition.

The amount of deformation of the skid plate 50 that can result in raveling of the concrete during cutting is often not visually detectable because of the strength of the skid plate 50. A skid plate that looks perfectly flat to the unaided eye, isn't, and even those small differences that are not visually perceptible can cause raveling. For example, the skid plates 50 are stamped from sheet metal. But the sheet metal comes in rolls, and inherently has a bend. Despite efforts to straightened the metal, or even grind it flat, the resulting skid plates have some residual bow, twist or uneven deformation that can cause raveling. The detection module 214 thus advantageously provides a preferred method of detecting and setting the preloading to achieve not only predictable, but repeatable force or deformation profiles over the skid plate in order to improve the support of the concrete surface 38 by the skid plate 50.

Further, during stamping and handling, the skid plates 50 are twisted, and they are thin enough and long enough that the twisting causes a permanent deformation that is also not always visible to the unaided eye. The result is that the amount of support provided to the concrete surface adjacent the up-cutting edge of the cutting blade 30 can vary on opposite sides of the cutting blade because of this twisted skid plate. This variation in support may be significant. On one side of the blade 30 the support may be adequate, but on the other side of the blade the support may be inadequate and raveling will occur constantly, or sometimes occur when traversing bumps or depressions.

The two adjustment screws 318 are also used to adjust the preloading across the width of the skid plate 50 as measured by the sensors 278a and 278b, in order to compensate for this undesirable twist in the skid plates. Adjusting one of the adjustment screws 318 independently of the other will effect a diagonal lift across the length of the skid plate 50 by the truss 52 to compensate for the twist and correct the preloading. For example, referring to FIGS. 3, 4, 10 and 11, tightening screw 334a will cause the leading end of side 104b to move away from the support 268a and sensor 278a. Tightening screw 334b will cause the leading end of side 104a to move away from the support 268b and sensor 278b. Loosening screws 334a, 334b have the opposite effect.

The relation between the amount of tightening and the amount of movement on the diagonally opposite end of the skid plate varies with the strength and location of the truss 52, the strength and configuration of skid plate 50, and the location of screws 334. Locating the screws 334 outward, toward the lateral sides of the skid plate 50 and away from the plane of the slot 90 and cutting blade 30, increases the skid plate deformation for a given turn of screws 334a, 334b. Thus, in FIGS. 12–13, the screws 334 are located toward the outer sides of the adjustment unit 216 and skid plate 50, in order to achieve greater movement for fewer turns and smaller movements of the screw 304.

As seen best in FIGS. 4 and 9–13, the truss 52 comprises opposing members 104a, 104b that are located toward the lateral sides of skid plate 50, as far from the plane of the slot 90 and cutting blade 30 as possible. The truss members 104a, 104b are also relatively narrow so the force transmitted by those members is concentrated far away from the plane containing the slot 90 and cutting blade 30. For, example, a skid plate 50 has a middle support section 66 about 9.5 inches (24 cm) long for a 10 inch (25 cm) diameter cutting blade 30 (FIG. 1–3). The skid plate 50 is about 2.5 inches (6.4 cm) wide and a thickness of about 14 gage (0.075 inches, 0.19 cm) steel, with an end to end length of about 13 inches (10.5 cm). The truss members 132, 134 are metal, preferably steel, and located in a plane about 0.6 inches (1.3 cm) above and substantially parallel to the plane of the support portion 66. The truss members 132, 134 are about 0.03 to 0.04 inches thick (0.08 to 0.1 cm), and preferably cadmium coated to prevent rusting.

As discussed above, raveling can be significantly reduced by preloading the skid plate 50 to achieve a predetermined force distribution when the middle portion 66 is pressed against the concrete surface 38 by the saw 24 as in FIGS. 1 and 2. Having the force distributed uniformly over the support portion 66 of skid plate 52 is preferred. For instance, one commercial embodiment of the saw 24 exerts about 24 pounds (11 kg) of force at each mounting block 56, 58, during cutting for a total of about 48 pounds (22 kg). These forces can be determined by methods known to those of ordinary skill in the art, and are not described in detail herein. The skid plate 52 is about 12 inches (30.5 cm) between pins 164 (FIG. 7), with support portion 66 about 9.5 inches (24 cm) long. To simulate that loading by the saw 24 on the skid plate 52, each of the weights 236 and 240 is also about 24 pounds (11 kg). A uniform distribution of this weight on the skid plate 52 will have about ⅙ the weight on each of the supports 268a, 268b and sensors 278a and 278b, about ⅓ the weight on each of the supports 268c, 268d and sensors 278c and 278d. For the 48 pound (22 kg) weight, this amounts to a force of about 8 pounds (3.6 kg) detected by each of the sensors 278a, 278b, and a force of about 16 pounds (7.3 kg) detected by each of the sensors 278c and 278d.

A variation of about ±20% at each of the leading and trailing ends of the support portion 66 are believed to produce suitable results during cutting. For the above described commercial embodiment, that amounts to amounts to as little as 12.8 pounds (5.8 kg), or as much as 19.3 pounds (8.8 kg) detected by sensor 278c, and by sensors 278a and 278b combined. A variation of about +20% and −30% is believed suitable for the central sensor 278d. It is preferred to have the center of the support portion 66 lighter, rather than heavier; alternately phrased, the center of support portion 66 can bend more away from the concrete than it can toward it before raveling occurs. Similarly, it is preferred to have the leading end of the skid plate heavier or more deformed toward the concrete, rather than urged against the concrete with less face. This is because raveling is more sensitive to the deformation or lack of support at the leading end 96 of the skid plate 50.

The acceptable variation in the force or deformation across the width of the skid plate 50 adjacent the region where the saw blade 30 exits the concrete is smaller than for the remainder of the skid plate. This is also because raveling is most sensitive to the support of the concrete at this location, and thus more likely to occur for unsymmetrical preloading at this location, or insufficient support on one side of the skid plate 50 at this location. Thus, it is believed possible that the variation on opposite sides of the slot 90 is advantageously less than about 20% at the leading edge 96 of slot 90, but may vary as much as 40% from side to side along the remaining length of the sides 104a, 104b, while still producing suitable results during cutting. Thus, for example the leading sensor 278a might detect as little as 12.8 pounds (5.8 kg) while the adjacent sensor 278b might detect as much as 19.3 pounds (8.8 kg).

It is also believed suitable, but with less desirable control over raveling, to have the force vary by 40% at the leading and trailing edge sensors 278a, 278b and 278c, with the force varying at the central sensor 278d by ±30% and −50%. If the sensors 278 detect deformation rather than force as in this example, then a suitable deformation profile and variation corresponding to these forces would be determined.

The precise amount of force variation that will permit suitable results will vary with the size and configuration of the skid plate assembly 20, as well as the hardness of the concrete during cutting. But give the teachings of this specification, one skilled in the art can determine suitable force or deformation variations within which to adjust the preloading in order to achieve the desired control of raveling during cutting.

Referring to FIGS. 8 and 9, it may be desirable in some cutting situations to adjust the force applied on the ends of the skid plate assembly 20 independently and produce more or less force at the leading or trailing end of the skid plate 52. The adjustment screws 196 may be independently adjusted to vary the downward forces applied to the two shafts 160 connected to the ends of the skid plate assembly 20. Thus the desired force distribution may be adjusted so that it is no longer uniform but produces desirable cutting results. The amount of permissible variation will depend on the particular needs and circumstances. Suitable variations to accommodate such non-uniform forces or deformation can be obtained by calibrating the skid plate assembly 20 with the calibration apparatus 210 and observing the performance of the skid plate assembly 20 in operation. To simulate such non-uniform loading of the skid plate assembly 20, the calibration apparatus 210 can use weights 236, 240 of suitable, and likely different, values to simulate the loading from the saw 24.

Alternatively, a variable loading mechanism can be incorporated into the calibration apparatus 210. For example, the adjustment screws 196 and springs 188 illustrated FIGS. 7 and 8 for mounting the skid plate assembly 20, can be adapted to replace the shafts 232, 234 (FIGS. 9–10), with the adjustment screws 196 being used to produce the desired simulated force or deformation profile. This is another example of the advantages of the ability of the calibration apparatus 210 to simulate the actual operational conditions of the skid plate assembly 20.

Operation of the Calibrated Skid Plate Assembly

Referring to FIGS. 1 and 2, the skid plate assembly 20 is mounted onto the saw 24 for curing the groove 42 in the concrete as the saw moves across a portion of the concrete surface 38. The amount of raveling has been shown to vary with the force distribution over the middle portion 66 adjacent the groove 42 being cut in the concrete surface 38.

Applicants have found that raveling can be reduced when the skid plate assembly 20 provides adequate support for the concrete surface 38 adjacent the location where the curing blade 30 exits the concrete surface 38 to minimize or prevent raveling, since raveling is especially prone to occur in that region. To a lesser extent, raveling also tends to occur in an area adjacent the location where the cutting blade 30 enters the concrete surface 38. The skid plate assembly 20 desirably provides sufficient support for the concrete surface 38 in that area as well. The skid plate assembly 20 desirably provides support, more desirably uniform support, for the concrete surface 38 along the entire length from where the curing blade 30 enters to where the curing blade 30 exits the concrete surface 38. The skid plate assembly 20 advantageously also provides even support on both sides of the cutting blade 30.

The calibration apparatus 210 of FIGS. 9–16 is able to calibrate the skid plate assembly 20 to produce a desired force or deformation distribution on the concrete surface 38 through the support portion 66 of the skid plate assembly 20 by adjusting the preloading on the skid plate 50 by the truss 52. Given the disclosure herein, however, various other ways of implementing the skid plate assembly 20 to achieve the preloading of the skid plate 50 to achieve the desired support of the concrete surface 38 could be devised by one of skill in the art without undue experimentation.

The present method and apparatus are especially suitable for cutting concrete before it has reached its typical, rock-like hardness. This cutting preferably begins immediately after finishing of the concrete surface, and is often referred to as "early cutting." Suitable saws are described in more detain in U.S. Pat. Nos. 4,769,201 and 5,429,109, the contents of which are incorporated herein by reference. As described in greater detail in those patents, because the concrete can be cut by the saw 24 while the concrete is not yet hard, the size of the slot 90 surrounding the cutting blade 30 must be designed so the skid plate 52 provides sufficient support to the concrete surface 38 surrounding the cutting blade to reduce raveling of the groove 90.

When properly calibrated, the skid plate assembly 20 is believed suitable for cutting grooves 42 without raveling when the concrete has a hardness such that a steel rod weighing about 5.75 pounds, having a diameter of 1.125 inches, when dropped from a height of about 24 inches from the surface 38 of the concrete, makes an indentation of about 0.5 inch (1.27 cm) with a flat end of the rod. The skid plate assembly 20, when properly calibrated, is also believed suitable for cutting grooves 42 in harder concrete without raveling, as where the above-described rod produces indentations of 1/32 of an inch or less. Preferably, the saw 24 and skid plate assembly 20 are used before the concrete 38 cracks, and ideally, before the concrete reaches a hardness at which conventional saws can cut the concrete without supporting the surface adjacent the cut groove. As the saw 24 is used to cut harder concrete, the downward force on the cutting blade 30 may need to be increased, while the force on the skid plate 50 may be reduced, so long as sufficient force is applied by the skid plate 52 to support the concrete surface 38 adjacent the groove 42 to inhibit raveling of the concrete at the cut groove 42.

Detailed Description of Skid Plate & Truss Assembly

In order to ensure that one skilled in the art appreciates the details of construction of the illustrated skid plate assembly 22, the following disclosure is given. Referring to FIGS. 3 and 4, the skid plate 50 has a leading edge 62 at one end, a trailing edge 64 at the other end, and a middle or support portion 66 between the leading edge 62 and trailing edge 64. The leading and trailing edges 62 and 64 are advantageously inclined upwardly away from the concrete surface 38 and toward the saw 24 with an incline slope, forming a leading inclined portion 72 and a trailing inclined portion 74. The leading inclined portion 72 has one end connected to the leading edge 62 and another end connected to a leading mount portion 82. The trailing inclined portion 74 has one end connected to the trailing edge 64 and another end connected to a trailing mounting portion 84. The mounting portions 82 and 84 are also referred to as ends of the skid plate 50. The trailing mounting portion 84 has a trailing edge 88, as best seen in FIG. 3.

As shown in FIGS. 3 and 4, the mounting portions 82 and 84 are offset vertically by a distance from the concrete surface 38. The middle portion 66 thus depends from the saw 24 a distance sufficient to contact the concrete surface 38 to support the concrete surface 38 during cutting and to inhibit raveling of the concrete surface 38 adjacent the groove 42. The mounting portions 82 and 84 can be configured to adapt to the particular mounting configuration of the saw 24. In the embodiment shown in FIGS. 1 and 2, the mounting portions 82 and 84 of FIGS. 3 and 4 are parallel to the middle portion 66 of the skid plate 50.

The slot 90 has inner side edges 94a and 94b which extend through the thickness of the skid plate 50 to the bottom of the skid plate 50 that faces and contacts the surface 38 of the concrete, as best seen in FIG. 5. The slot 90 has a leading end 96 and a trailing end 98. At a point near the trailing end 98 of the slot 90, a recess 100 extends into the bottom surface of the skid plate 50 and stretches from the trailing end 98 of the slot 90 to the trailing edge 64 of the skid plate 50.

As illustrated in FIGS. 3–5, the skid plate 50 has side portions 104 which extend from the slot 90 outwardly. The middle portion 66 is desirably about 9.5 inches (24 cm) long and 2 inches (5 cm) wide, for a total area of about 19 square inches (120 cm$^2$), when used with a cutting blade 30 of about 10 inches (25 cm) in diameter. Advantageously, the middle portion 66 is made of 12 gage stainless steel, which has a thickness of about 0.1046 inch (0.266 cm). Accordingly, the slot 90 depth is also 0.1046 inch. The skid plate 50 is advantageously made of stainless steel so that it will not wear at an excessive rate.

It is preferred that the slot 90 have a width such that the side edges 94a and 94b of the slot 90 are as close to the sides of the cutting segments of the cutting blade 30 as possible, without contact between the cutting segments and slot side edges 94a and 94b. A slot width of about 0.118 to 0.120 inches (0.23–0.30 cm) is believed advantageous for the illustrated skid plate 50, although a slightly wider slot width of 0.13 inch (0.33 cm) is believed to perform satisfactorily while being slightly easier to manufacture.

Referring to FIGS. 3–5, the truss 52 has a leading mounting portion 122 and a trailing mounting portion 124. The leading mounting portion 122 has a generally rectangular shape and desirably includes holes 126 located for attachment with the leading mounting portion 82 of the skid plate 50. The trailing mounting portion 124 has a generally triangular shape and desirably includes holes 128 provided for attachment with the trailing mounting portion 84 of the skid plate 50. The holes 128 are not circular, but advantageously are elongated, each with a leading end 129a and a trailing end 129b, to allow preloading of the skid plate 50 by the truss 52 and the adjustment thereof as discussed below.

A pair of arms 132 and 134 extend between the mounting portions 122 and 124. The arms 132 and 134 are used to exert the preloading on the skid plate 50, and are desirably the same in construction for balance in preloading on the skid plate 50. The arms 132 and 134 can be a variety of shapes and sizes, but are desirably thin strips. As discussed below, the width of the arms 132 and 134, as well as the thickness of the truss 52, is chosen according to the load exerted on the skid plate 50 by the particular saw 24. The truss 52 is advantageously cut or punched out of thin metal, preferably steel, that is subsequently cadmium coated to prevent rusting. Steel sheets about 0.03 to 0.04 inch thick (0.08 to 0.1 cm) are believed suitable.

As best seen in FIG. 3, the leading mounting block 56 and trailing mounting block 58 are advantageously U-shaped. The leading mounting block 56 has holes 142 and the trailing mounting block 58 has holes 144 through which threaded fasteners 146 and 148 are used to attach the skid plate 50 and truss 52 with the mounting blocks 56 and 58. The fasteners 146 pass through holes 85 of the skid plate 50 and holes 126 of the truss 52 to fasten the skid plate 50 and truss 52 to the leading mounting block 56. The fasteners 148 pass through holes 86 of the skid plate 50 and holes 128 of the truss 52 to fasten the skid plate 50 and the truss 52 to the trailing mounting block 58. The fastened structure forms the skid plate assembly 20 that can be mounted onto the saw 24 of FIGS. 1 and 2.

Referring to FIG. 6, another embodiment of the skid plate 50' is shown for use with a larger commercial embodiment of the saw illustrated in FIG. 6. The superscript prime (') is used to denote like components with the skid plate 50 of FIGS. 3 and 4, but the details of the skid plate and truss will not be repeated. To accommodate larger diameter cutting blades 30, the skid plates 52 become larger, and the truss 52 becomes so large that the thin metal trusses 132, 134 (FIGS. 3–4) are easily bent or damaged during manufacturing, handling, assembly and shipping. Thus, wider truss arms 132', 134' as shown in FIG. 6 are used to avoid or reduce this damage. The width of truss arms 132', 134' is 0.375 inches (0.95 cm).

But it is more difficult to adjust the preloading on the skid plate 50', in part because the force transmitted by the truss arms 132', 134' are not as far away from the plane of the cutting blade. To facilitate calibration of the skid plate assembly 20' for a desired preloading, a transverse cut or recess 150 is advantageously provided at both ends of the arms 132' and 134'. The recess 150 may be cut by a saw after the truss 52 is stamped out of sheet metal and flattened. This provides a more rigid truss 52 for manufacturing, assembly, handling and shipping, but requires that all forces be transferred through the uncut portion adjacent recess 150. As the uncut portion adjacent recess or cut 150 is further away from the plane of the curing blade 30, adjusting the preload is easier. Thus, the recess 150 facilitates adjustment of the tensile or compressive stress of the arms 132', 134' to create the necessary preloading on the skid plate 50'. It is believed possible to use the recesses 150 at only the leading end of the skid plate 52, but this is not as desirable as having the recesses at opposing ends of arms 132', 134'.

The skid plate assembly 20 of FIGS. 7 and 8 as described is movably mounted relative to the concrete cutting saw 24. In this manner, the skid plate assembly 20 may float relative to the saw 24 while maintaining support of the surface 38 of the concrete as the concrete saw 24 traverses the concrete surface 38 during cutting, while providing a predetermined force on the skid plate 50 to support the concrete surface 38. This is important since the skid plate 50 acts as a support for the concrete surface 38 surrounding the groove 42 being cut. If the skid plate 50 is pressed against the concrete too hard, it will unacceptably mark or damage the concrete surface 38. If insufficient support is provided to the concrete surface 38 being cut, the surface 38 will ravel adjacent the groove 42.

As shown in FIG. 7 and 8, springs 188, one inside each bore 168 of the housing 170, rest on smaller top ends 192 of the shafts 160. Adjustment screws 196 are positioned above the springs 188 in each bore 168 at a point near the top of the blade housing 170, thus sandwiching the springs 188 against the top ends 192 of the shafts 160. The springs 188 are desirably coil springs so they can easily be inserted into the bores 168. The springs 188 are compressed into the bores 168 with the adjustment screws 196. Each adjustment screw 196, as illustrated, is a threaded plug 196 that engages the top portion of the bore 168, which has corresponding threads. The adjustment screws 196 may be advanced into the bores 168 to compress the springs 188 against the shafts 160 and vary the force with which the shaft 160 is angled downwards towards the surface 38 of the concrete.

The compression of the springs 188 between the top ends 192 of the shafts 160 and the adjustment screws 196 resiliently urges the shafts 160 away from the saw 24 and towards the concrete surface 38. The shafts 160 thus correspondingly force the skid plate 50 toward the surface 38 of the concrete. This is necessary to assist in pressing the skid plate 50 against the concrete surface 38 with a predetermined force. The spring size and amount of compression can be used to vary the force.

Because each of the two shafts 160 has its own independent adjustment screw 196, the compression of each spring 188 may be adjusted so that an individualized downward force may be applied to each of the shafts 160. Further individualized adjustments may be made by using stiffer or weaker springs 188. Locating the rods 180 at different positions in the housing 170 relative to the location of the slots 178 allows adjustment of the position of each end of the skid plate 50 relative to the blade housing 170. The rods 180 also act as limiting stops to limit the motion of the skid plate 50. These individualized adjustments permit the skid plate 50 to be adjusted so that the ends of the skid plate 50 are at different vertical positions in relation to the concrete surface 38 when the skid plate 50 is not in contact with the concrete surface 38, and allow adjustment of the force with which the skid plate 50 is urged against the concrete surface 38.

It will be understood that the above-described arrangements of apparatus and the methods therefrom are merely illustrative of applications of the principles of this invention and many other embodiments and modifications may be made without departing from the spirit and scope of the invention as defined in the claims. Thus, for example, a skid plate 50 may be connected to the saw at only one location. Similarly, the leading end of the skid plate 50 could be used to adjust the pre-loading rather than the trailing end. Alternatively, both ends of the truss 52 and/or the skid plate 50 could be used to adjust the pre-loading. Likewise, the module 212 could be oriented to accommodate a skid plate assembly 20 that is vertically oriented. Similarly, different methods and apparatus for applying the desired loads, forces or deformations could be devised by persons of skill in the art without undue experimentation, given the present disclosure, including the use of hydraulic or pneumatic actuators, springs, levers, gears, magnets, electric motors or solenoids. Moreover, the present description allows manual adjustment of the skid plate 50 in response to visually observed sensor readings, but the adjustment process could be automated to eliminate or minimize personal involvement. Finally, if the skid plate 50 mounts to the saw 24 at a single location rather than at opposing ends as illustrated, suitable modifications could be made by one of ordinary skill in the art to have a truss attached toward opposing ends of the skid plate and adjusted to achieve the desired deformation or force profile given the present teachings.

What is claimed is:

1. A method of calibrating a skid plate assembly comprising a skid plate having at least a leading and trailing end with least a first mounting portion configured to be releasably fastened to a saw, the mounting portion being connected to a support portion which has a slot through which a cutting blade extends during cutting, the slot having a leading end through which an up-cutting edge of the blade passes during cutting, and a truss for maintaining the skid plate in a predetermined configuration, comprising the steps of:

applying a predetermined loading to the skid plate, the loading causing the support portion to deform;

directly or indirectly monitoring the deformation of the skid plate at least at one location;

adjusting the deformation of the skid plate to achieve a predetermined deformation of the support portion; and connecting the truss to the skid plate to hold that predetermined deformation.

2. The method of claim 1, wherein the step of monitoring the deformation of the skid plate comprises the steps of:

supporting the skid plate at the support portion at least at one location with a first support;

detecting the forces the skid plate exerts on the first support; and providing the detected forces for use in adjusting the deformation.

3. The method of claim 2, wherein the step of supporting the skid plate comprises the step of supporting the support portion at least at two locations adjacent the leading end of the slot through the support portion and on opposite sides of that slot.

4. The method of claim 2, wherein the steps of supporting the skid plate comprises the step of supporting the support portion at least at the leading and trailing ends of the support portion.

5. The method of claim 2, wherein the step of supporting the skid plate comprises the step of supporting the support portion at least at the leading and trailing ends of the support portion, and at a location between the leading and trailing ends of the support portion.

6. The method of claim 1, wherein the step of applying a predetermined loading to the skid plate, comprises the step of applying a load selected to stimulate an operational load exerted on the skid plate by the saw.

7. The method of claim 2, wherein the step of applying a predetermined loading to the skid plate, comprises the step of applying a load selected to simulate an operational load exerted on the skid plate by the saw.

8. The method of claim 2, wherein the step of applying a predetermined loading to the skid plate, comprises the step of applying a load selected to simulate an operational load exerted on the skid plate during cutting of grooves in a concrete surface before the concrete has hardened sufficiently to crack.

9. The method of claim 2, wherein the step of applying a predetermined loading to the skid plate, comprises the step of applying substantially equal loads to opposing ends of the skid plate, wherein each of the applied loads is less than about 50 pounds (23 kg).

10. The method of claim 2, wherein the step of adjusting the deformation of the support portion comprises adjusting the deformation to achieve a deformation causing a substantially uniform force distribution along the length of the support portion, and also to achieve a substantially uniform force distribution on opposite sides of the leading end of the slot in the skid plate.

11. The method of claim 1, wherein the step of adjusting the deformation comprises moving the truss relative to the skid plate.

12. The method of claim 1, wherein the truss comprises a first truss member located above a first side of the support portion of the skid plate, and a second truss member located above a second side of the skid plate, the first and second sides of the skid plate being located on opposing sides of the slot in the support portion of the skid plate, and wherein the step of adjusting the deformation comprises adjusting the force in the first truss member to affect the deformation of the second side of the support portion.

13. The method of claim 1, wherein the step of adjusting the deformation of the support portion comprises adjusting the deformation to achieve a deformation causing a substantially uniform force distribution along the length of the support portion.

14. The method of claim 1, 2, 3, 6, 7, or 11, wherein the step of adjusting the deformation of the support portion comprises adjusting the deformation to achieve a deformation causing a substantially uniform force distribution along the length of the support portion.

15. The method of claim 1, 2, 3, 6, 7 or 11, wherein the step of adjusting the deformation of the support portion comprises adjusting the deformation to achieve a deformation causing a substantially uniform force distribution on opposite sides of the leading end of the slot in the skid plate adjacent the location at which at least the upcutting end of the cutting blade passes through the leading end of the slot during cutting.

16. The method of claim 1, 2, 3, 6, 7 or 11, wherein the step of connecting the truss to the skid plate to hold that predetermined deformation comprises the step of connecting opposing ends of the truss to opposing mounting portions located at opposite ends of the skid plate.

17. The method of claim 1, 2, 3, 6, 7 or 11, wherein the step of adjusting the deformation comprises the step of:
providing the truss with a first end and a second end, the first end being fastened to the first mounting portion of the skid plate, the second end being adjustably coupled to a second mounting portion of the skid plate, where the mounting portions are not in the plane of the support portion of the skid plate; and moving one of the mounting portions relative to the truss to adjust the deformation.

18. The method of claim 1, 2, 3, 6, 7 or 11, wherein the step of adjusting the deformation comprises the step of selecting the deformation to substantially counteract the deformation imparted to the support portion occurring during cutting.

19. A skid plate assembly having the support portion deformed and held in place as defined in claim 1, 2, 3, 6, 7 or 11.

20. An apparatus for calibrating a skid plate assembly for use with a concrete saw, the skid plate assembly comprising a skid plate with at least a first mounting portion configured to be releasably fastened to the saw, and a truss with a first end fastened to the skid plate and a second end and fasteners to hold the second end in a predetermined position, the skid plate comprising a support portion which has a slot through which a cutting blade extends during cutting, comprising:

at least one support located and configured to contact the support portion of the skid plate assembly during calibration;

a load application apparatus configured to apply a predetermined load at a predetermined location on the skid plate assembly, with at least a portion of that load being transferred to the support;

at least one sensor cooperating with the support to detect the force exerted on the support during calibration, the sensor providing output information correlated to the magnitude of the force, the load application apparatus having an adjustment device configured to deform the skid plate assembly to vary the sensor output.

21. An apparatus as defined in claim 20, further comprising a display cooperating with the sensor to visually display force information from the sensor.

22. An apparatus as defined in claim 20, wherein the at least one support comprises a support adjacent to and on opposite sides of the leading end of the slot when the skid plate assembly is placed on the apparatus for calibration.

23. An apparatus as defined in claim 20, wherein the support comprises a support at least at the leading and trailing ends of the support portion of the skid plate, and at a location between the leading and trailing ends of the support portion of the skid plate.

24. An apparatus as defined in claim 20, wherein the load application apparatus applies a load selected to simulate an operational load exerted on the skid plate assembly.

25. An apparatus as defined in claim 20, wherein the load application apparatus applies a load selected to simulate an operational load exerted on the skid plate during cutting of grooves in a concrete surface before the concrete has hardened sufficiently to crack.

26. An apparatus as defined in claim 20, wherein the load application apparatus applies substantially equal loads to opposing ends of the skid plate.

27. An apparatus as defined in claim 20, wherein the load application apparatus applies substantially equal loads to opposing ends of the skid plate and wherein each of the applied loads is less than about 50 pounds (23 kg).

28. An apparatus as defined in claim 20, wherein the load adjustment device adjusts the skid plate to achieve a substantially uniform force distribution along the length of the support portion.

29. An apparatus as defined in claim 20, wherein the load adjustment device adjusts the deformation of the skid plate to achieve a substantially uniform force distribution along the length of the support portion, and also to achieve a substantially uniform force distribution on opposite sides of the leading end of the slot in the skid plate.

30. An apparatus as defined in claim 20, wherein the load adjustment device varies the sensor output by relative movement of the truss and skid plate.

31. An apparatus as defined in claim 20, wherein the load adjustment device comprises a device adapted to achieve relative movement of the truss and skid plate, and wherein the load adjustment device is configured to deform the support portion of the skid plate to substantially counteract the deformation imparted to the support portion during cutting.

32. An apparatus as defined in claim 25, further comprising a skid plate assembly placed in the apparatus, with the truss being connected to the skid plate assembly to hold the predetermined deformation of the support portion after the skid plate assembly is removed from the apparatus.

33. An apparatus as defined in claim 20, 21, 22, 25 or 28, further comprising a skid plate assembly placed in the apparatus, wherein the load adjustment device comprises a device adapted to achieve relative movement of the truss and skid plate, and wherein the load adjustment device is configured to deform the support portion of the skid plate to substantially counteract the deformation imparted to the support portion during cutting.

34. An apparatus for calibrating a skid plate assembly for use with a concrete saw, the skid plate assembly comprising a skid plate with at least a first mounting portion configured to be releasably fastened to the saw, and a truss with a first end fastened to the skid plate and a second end and fasteners to hold the second end in a predetermined position, the skid plate having a support portion which has a slot through which a cutting blade extends during cutting, comprising:

at least one support located and configured to contact the support portion of the skid plate assembly during calibration;

load application means for applying a predetermined load to the skid plate assembly to simulate predetermined operating conditions, with at least a portion of that force being transferred to the support;

at least one sensor cooperating with the support to detect the deformation of the support during calibration, the sensor providing output information; and adjustment means for deforming the skid plate assembly in response to the sensor output information to achieve a predetermined deformation of the support portion.

35. An apparatus as defined in claim 34, further comprising a display cooperating with the sensor to visually display force information from the sensor.

36. An apparatus as defined in claim 34, wherein the load application means is configured to apply substantially equal loads to opposing ends of the skid plate and wherein each of the applied loads is less than about 50 pounds (23 kg).

37. An apparatus as defined in claim 34, wherein the adjustment means is configured to adjust the skid plate assembly to obtain a substantially uniform force distribution along the length of the support portion.

38. An apparatus as defined in claim 34, 35 or 36, wherein the load adjustment means is configured to adjust the skid plate assembly to obtain a substantially uniform force distribution on opposite sides of the leading end of the slot in the skid plate.

39. An apparatus as defined in claim 34, 35 or 36, wherein the load adjustment means is configured to adjust the skid plate assembly to obtain a deformation of the support portion that offsets the normal deformation of the support portion occurring during normal use of the skid plate assembly to cut concrete.

40. An apparatus as defined in claim 34, 35 or 36, further comprising a skid plate assembly placed in the apparatus, with the truss being connected to the skid plate assembly to hold the predetermined deformation of the support portion after the skid plate assembly is removed from the apparatus.

41. A method of calibrating a skid plate assembly comprising a skid plate having at least a leading and trailing end with least a first mounting portion configured to be releasably fastened to a saw, the skid plate having a slot through which a cutting blade extends during cutting, and a truss for maintaining the skid plate in a predetermined configuration, comprising the steps of:

applying a predetermined loading to the skid plate causing the skid plate to deform;

directly or indirectly monitoring the deformation of the skid plate at least at one location;

adjusting the deformation of the skid plate in response to the monitoring in order to achieve a predetermined deformation of the skid plate; and connecting the truss to the skid plate to hold the predetermined deformation.

42. An apparatus for calibrating a skid plate assembly for use with a concrete saw, the skid plate assembly comprising a skid plate with at least a first mounting portion configured to be releasably fastened to the saw, the skid plate having a slot through which a cutting blade extends during cutting, comprising:

at least one support located and configured to contact the skid plate assembly during calibration;

a load application apparatus configured to apply a predetermined load at a predetermined location on the skid plate to bow the skid plate and having an adjustment device configured to change the bowing of the skid plate;

at least one sensor cooperating with the support and responsive to the bowing of the skid plate to provide output information correlated to the bowing of the skid plate; and a truss fastened to the skid plate to hold the skid plate in a predetermined bowed configuration that is achieved by varying the bowing in response to the sensor output information.

* * * * *